Figure 13:
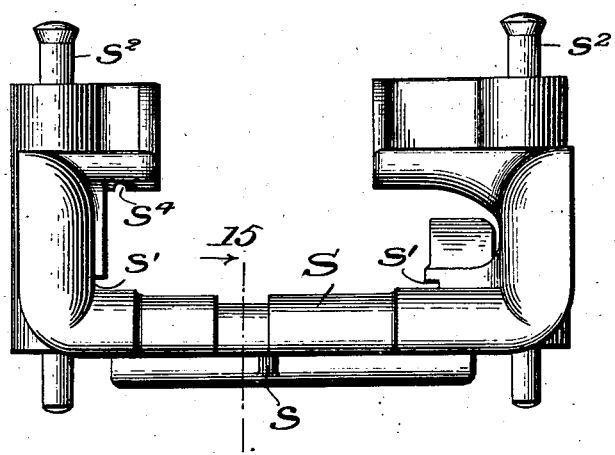

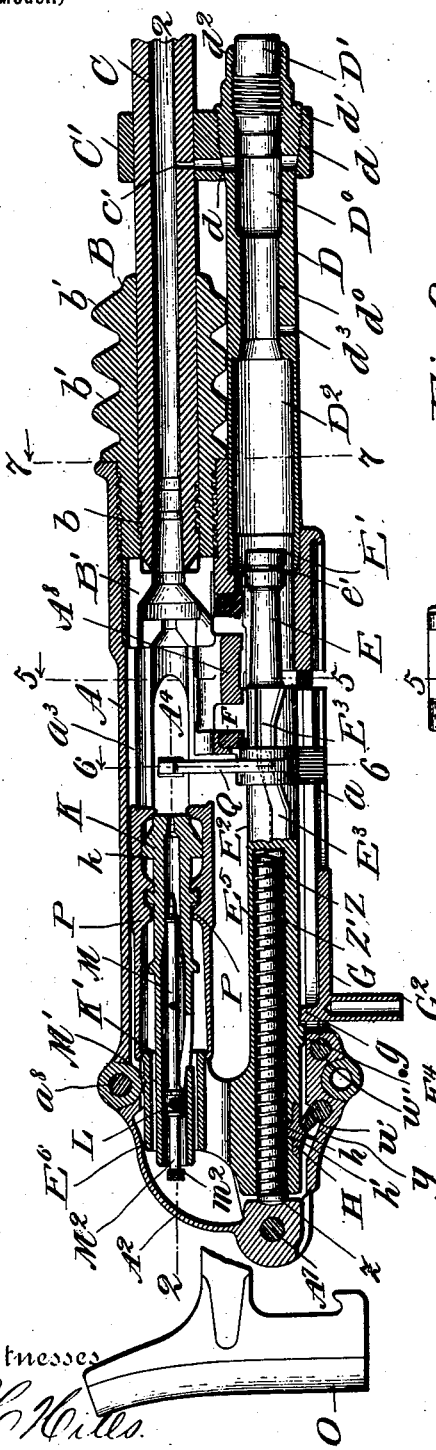

No. 696,306. Patented Mar. 25, 1902.
L. V. BENÉT & H. A. MERCIÉ.
AUTOMATIC GUN.
(Application filed May 2, 1899.)
(No Model.) 16 Sheets—Sheet 2.
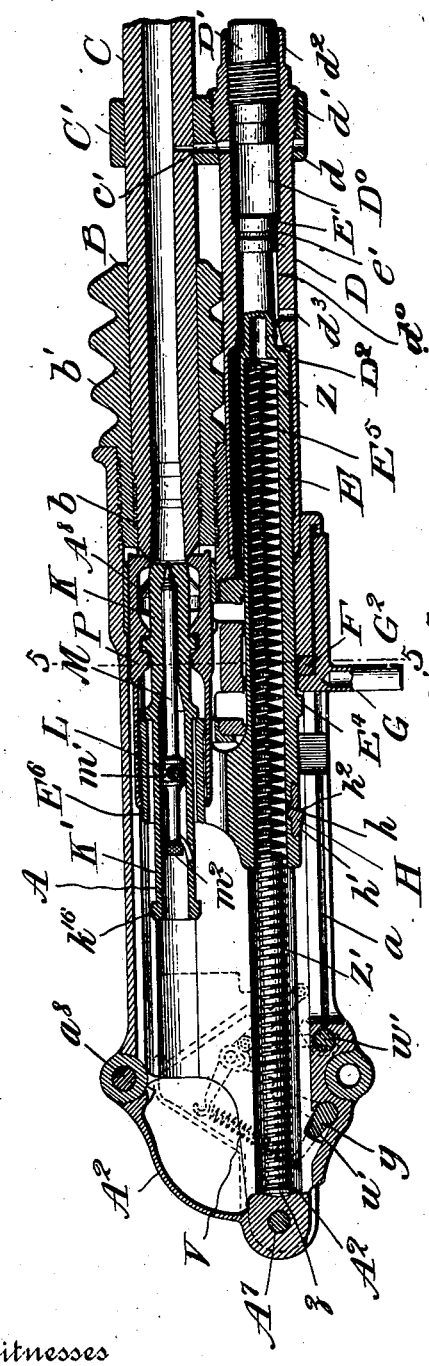
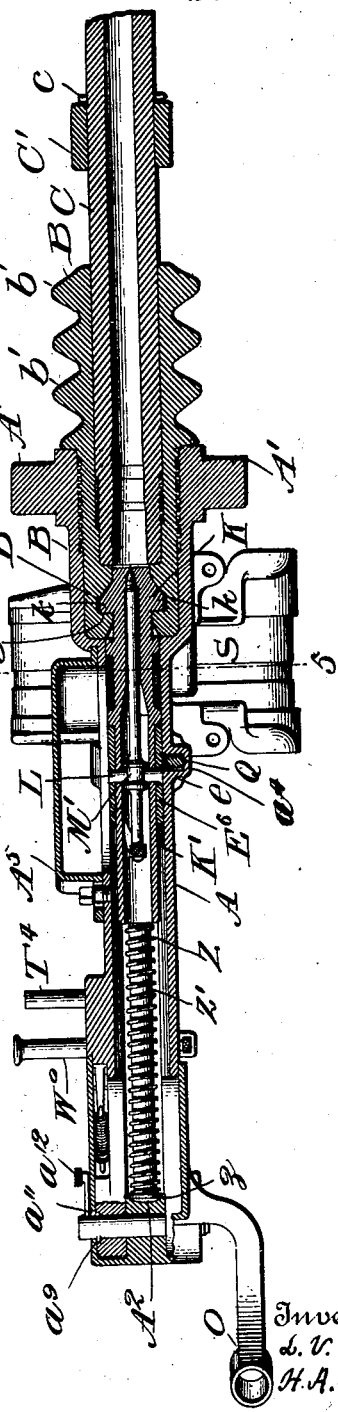
Witnesses
L. C. Hills
Clarence A. Bateman
Inventors
L. V. Benét
H. A. Mercié,
By Wilkinson & Fisher,
Attorneys.

No. 696,306. Patented Mar. 25, 1902.
L. V. BENÉT & H. A. MERCIÉ.
AUTOMATIC GUN.
(Application filed May 2, 1899.)
(No Model.) 16 Sheets—Sheet 3.
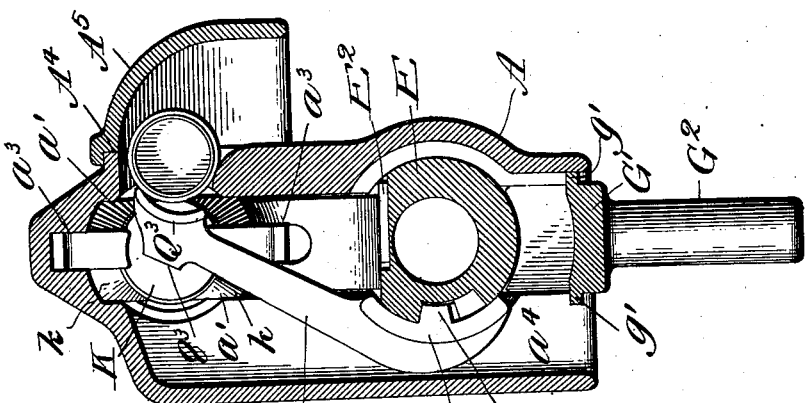
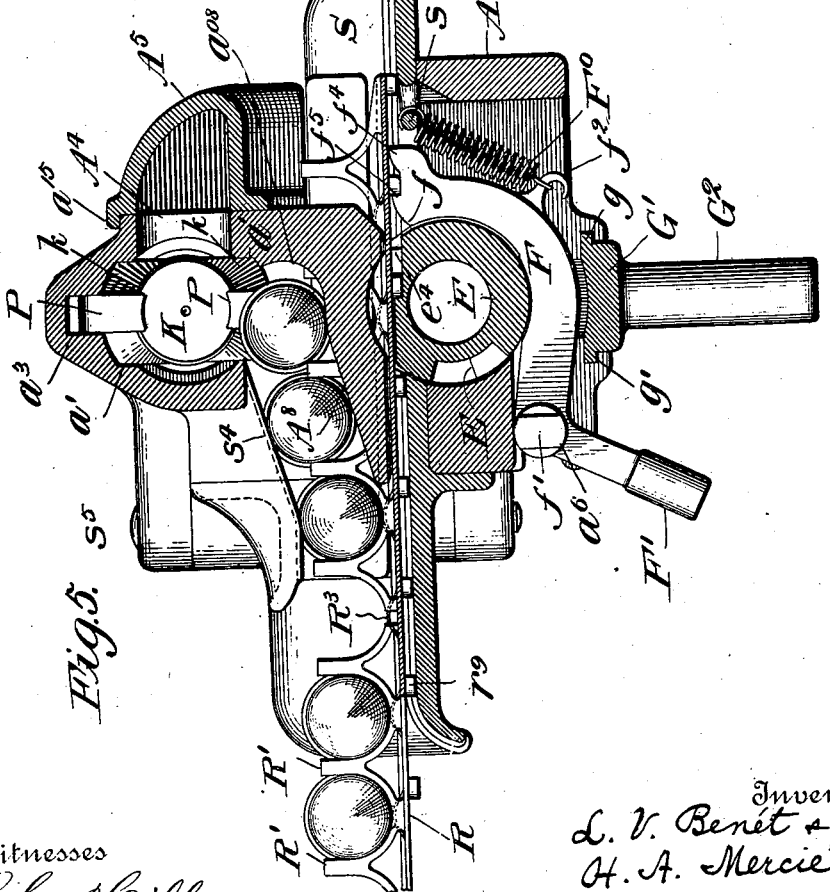

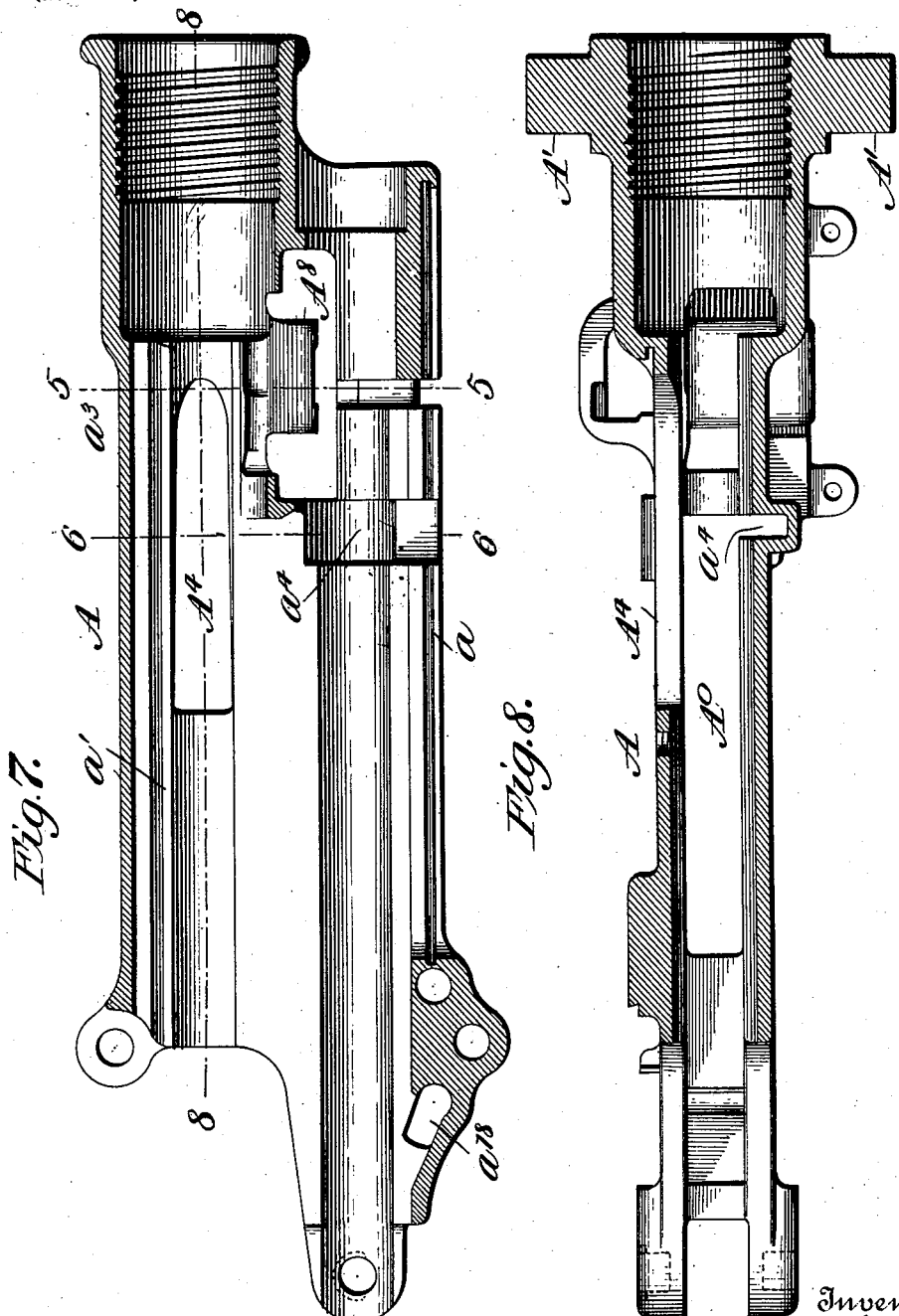

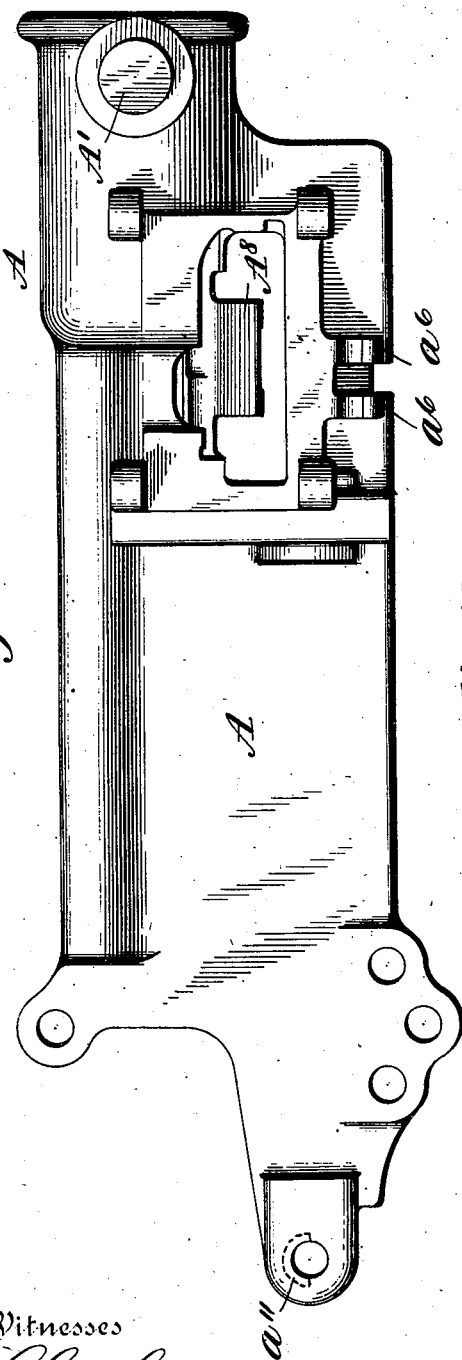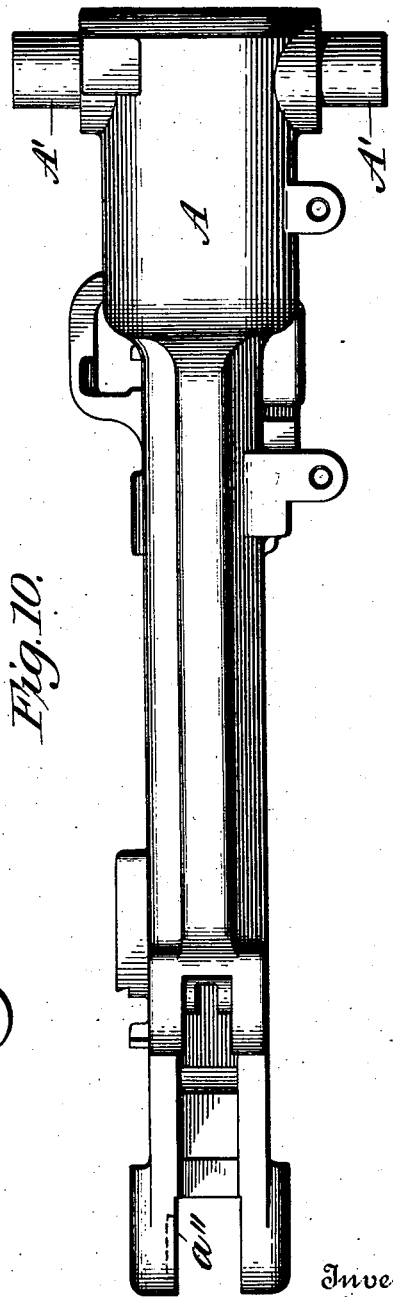

No. 696,306. Patented Mar. 25, 1902.
L. V. BENÉT & H. A. MERCIÉ.
AUTOMATIC GUN.
(Application filed May 2, 1899.)
(No Model.) 16 Sheets—Sheet 6.
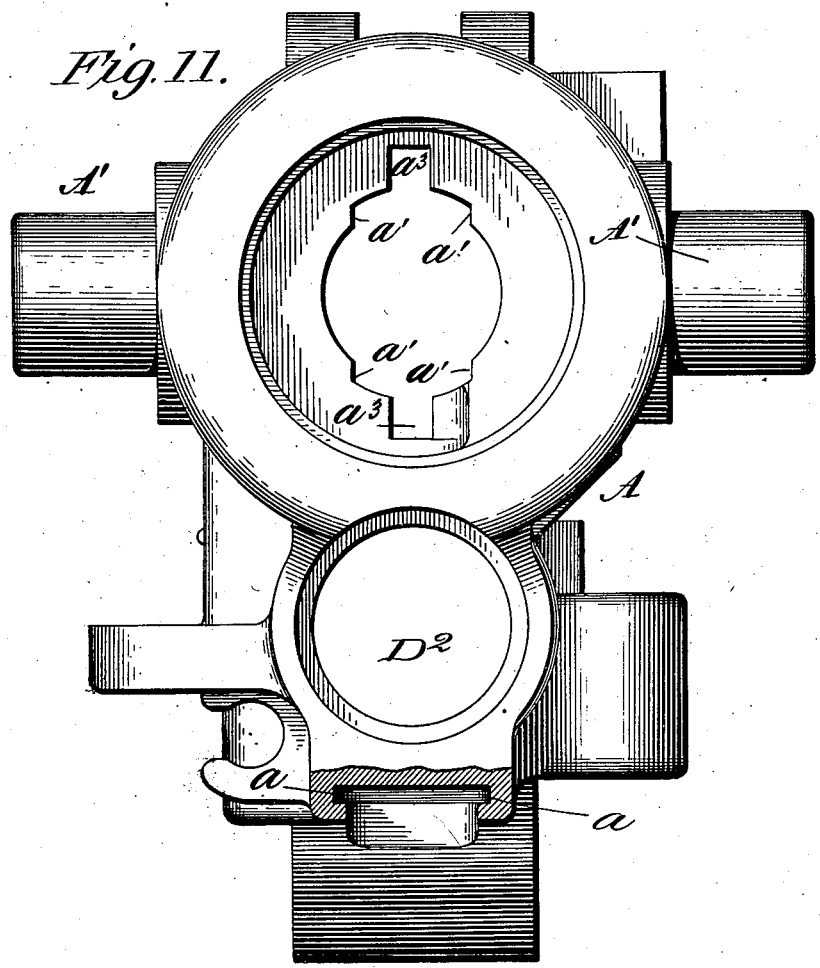
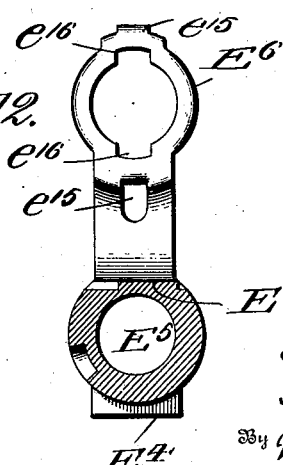
Witnesses
L. C. Hills.
Clarence A. Bateman
Inventors
L. V. Benét +
H. A. Mercié,
By Wilkinson + Fisher,
Attorneys.

No. 696,306. Patented Mar. 25, 1902.
L. V. BENÉT & H. A. MERCIÉ.
AUTOMATIC GUN.
(Application filed May 2, 1899.)
(No Model.) 16 Sheets—Sheet 7.

Witnesses
L. C. Hills
Clarence A. Bateman

Inventors
L. V. Benét
H. A. Mercié,
By Wilkinson + Fisher,
Attorneys

No. 696,306. Patented Mar. 25, 1902.
L. V. BENÉT & H. A. MERCIÉ.
AUTOMATIC GUN.
(Application filed May 2, 1899.)
(No Model.) 16 Sheets—Sheet 8.

Witnesses
L. C. Hills
Clarence D. Bateman

Inventors
L. V. Benét &
H. A. Mercié,
By Wilkinson & Fisher,
Attorneys.

No. 696,306. Patented Mar. 25, 1902.
L. V. BENÉT & H. A. MERCIÉ.
AUTOMATIC GUN.
(Application filed May 2, 1899.)
(No Model.) 16 Sheets—Sheet 9.
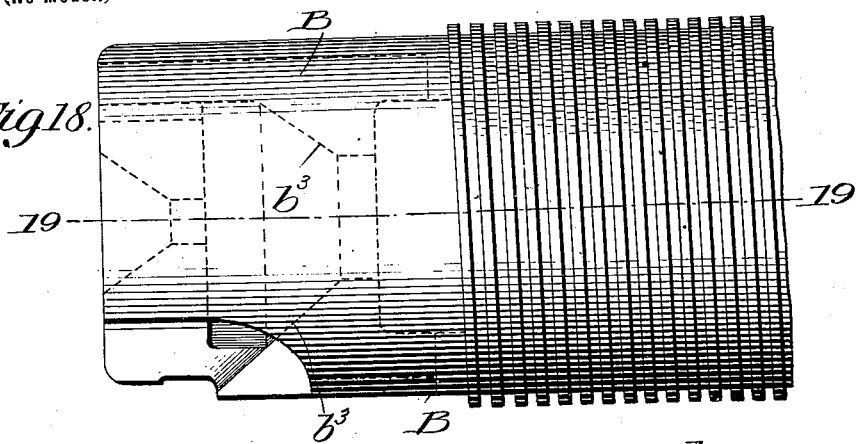
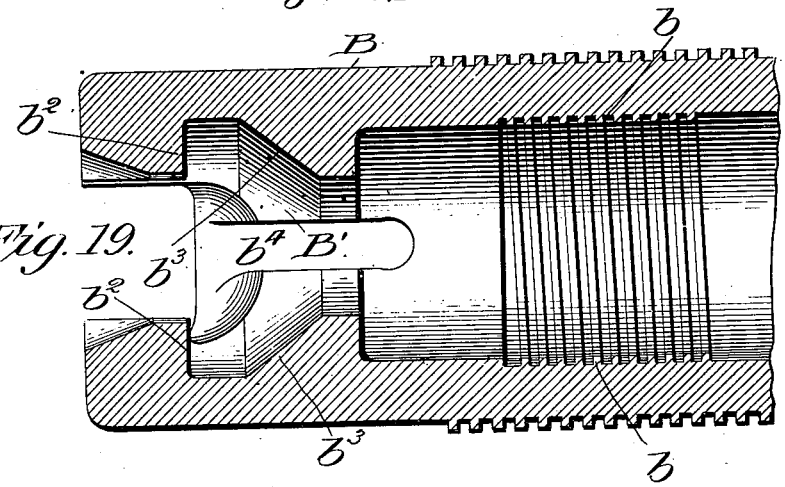
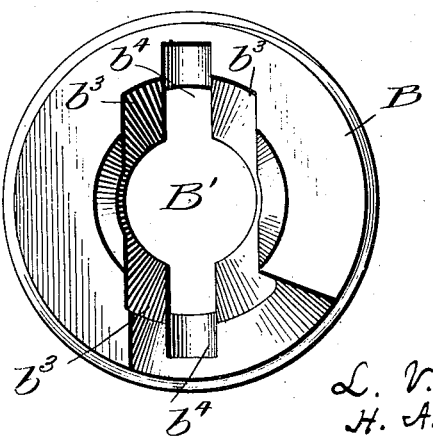

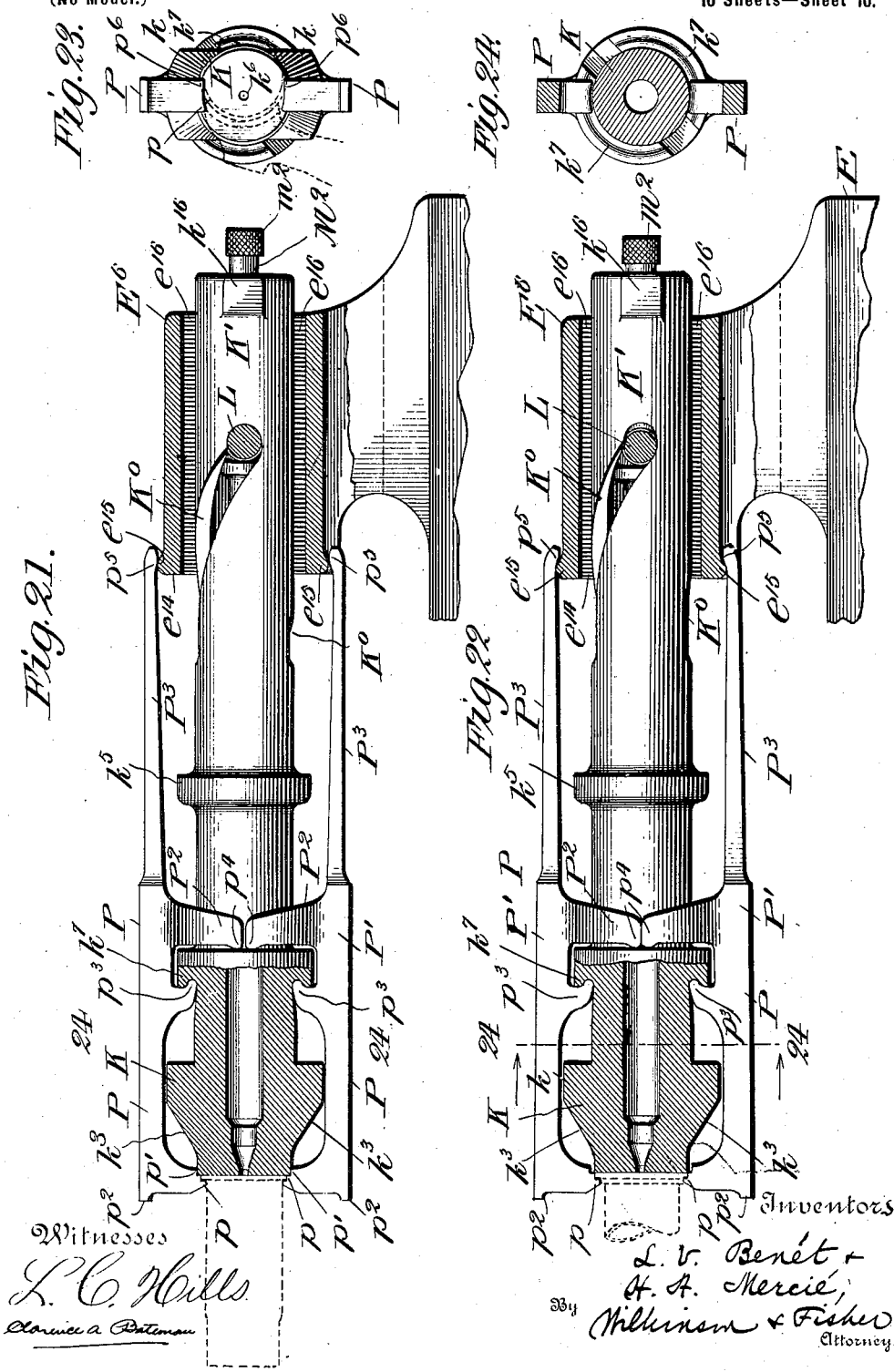

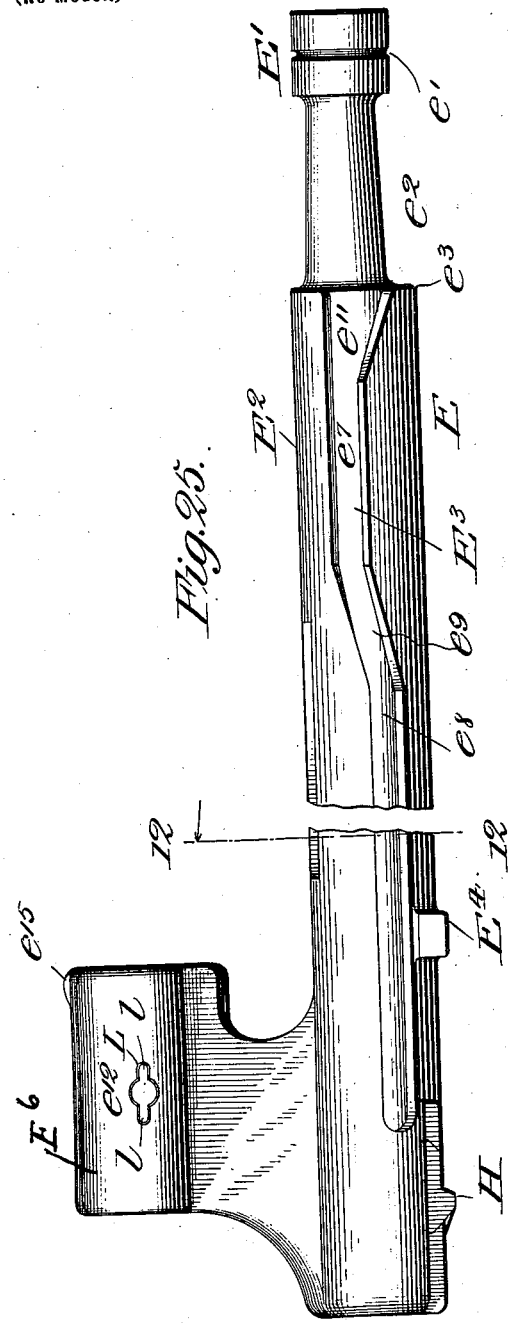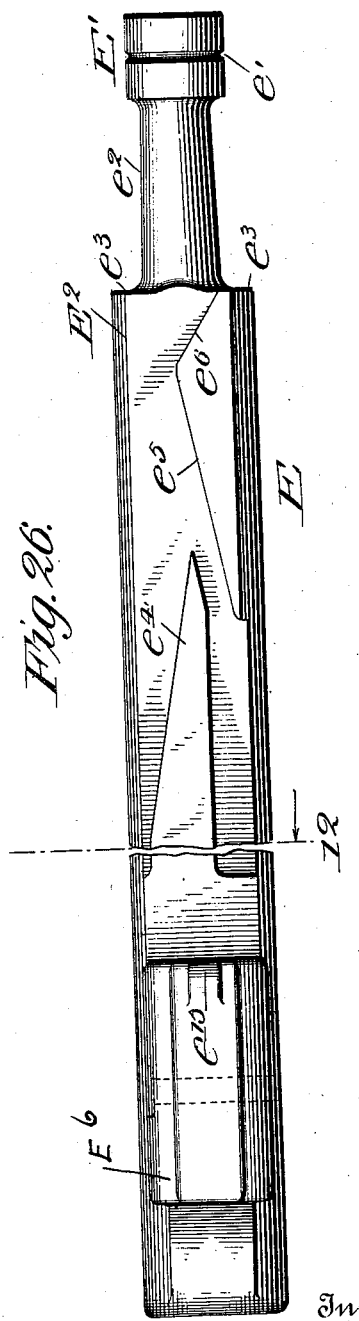

No. 696,306. Patented Mar. 25, 1902.
L. V. BENÉT & H. A. MERCIÉ.
AUTOMATIC GUN.
(Application filed May 2, 1899.)
(No Model.) 16 Sheets—Sheet 12.
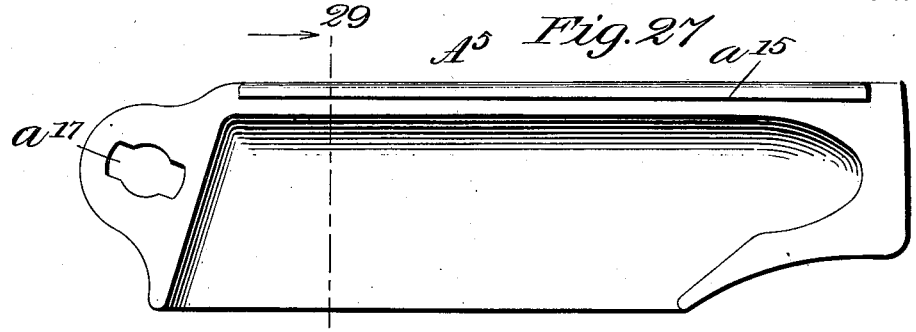
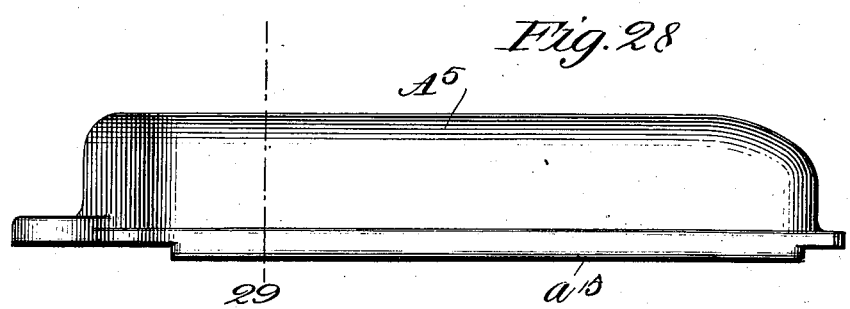
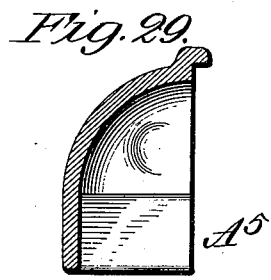  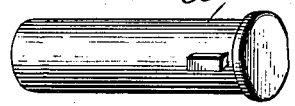
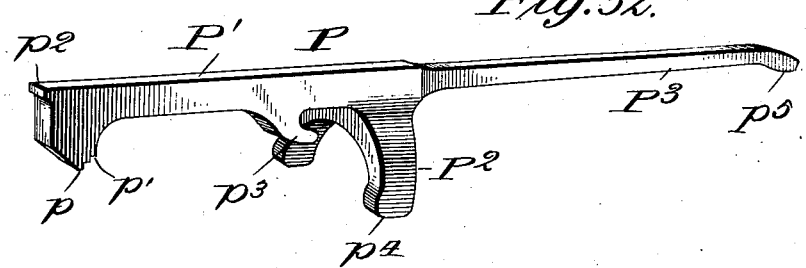
Witnesses
L. C. Hills
Clarence A. Bateman
Inventors
L. V. Benét &
H. A. Mercié,
By Wilkinson & Fisher,
Attorneys.

No. 696,306. Patented Mar. 25, 1902.
L. V. BENÉT & H. A. MERCIÉ.
AUTOMATIC GUN.
(Application filed May 2, 1899.)
(No Model.) 16 Sheets—Sheet 13.
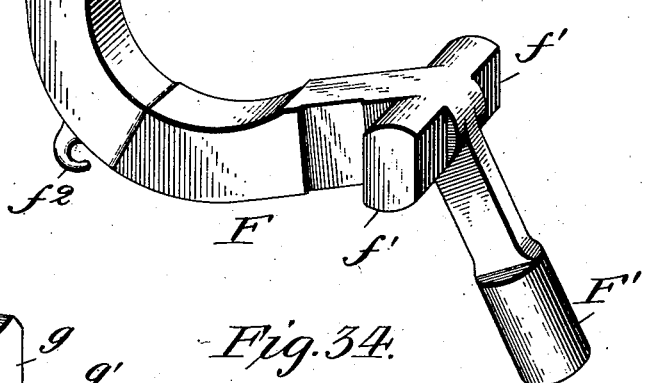
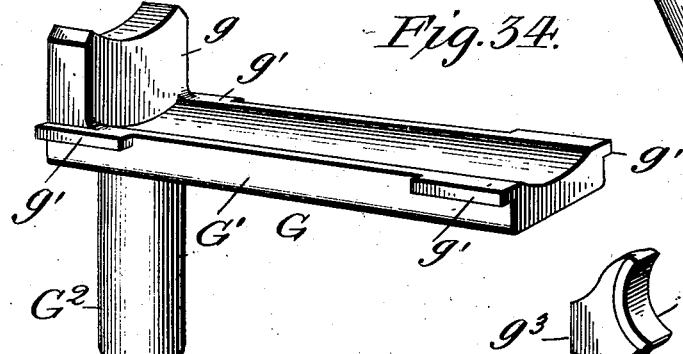
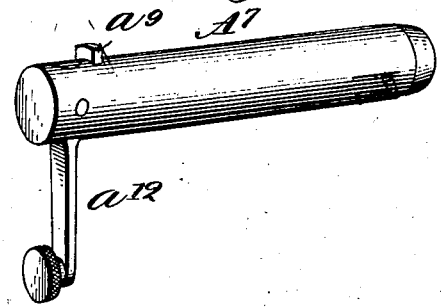
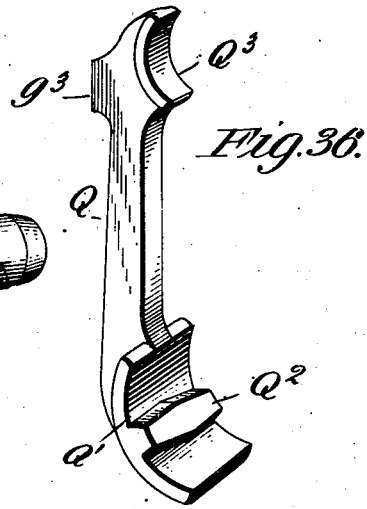
Witnesses
L. C. Hills
Clarence A. Bateman
Inventors
L. V. Benét &
H. A. Mercié,
By Wilkinson & Fisher,
Attorneys.

No. 696,306. Patented Mar. 25, 1902.
L. V. BENÉT & H. A. MERCIÉ.
AUTOMATIC GUN.
(Application filed May 2, 1899.)
(No Model.) 16 Sheets—Sheet 14.

Witnesses
Inventors
L. V. Benét
H. A. Mercié,
By Wilkinson + Fisher,
Attorneys

No. 696,306. Patented Mar. 25, 1902.
L. V. BENÉT & H. A. MERCIÉ.
AUTOMATIC GUN.
(Application filed May 2, 1899.)
(No Model.) 16 Sheets—Sheet 15.
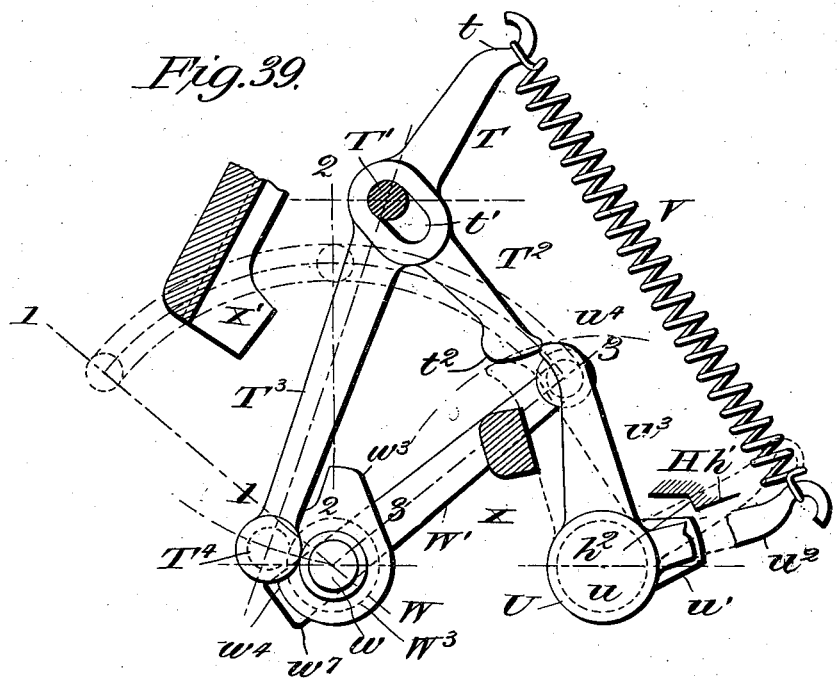
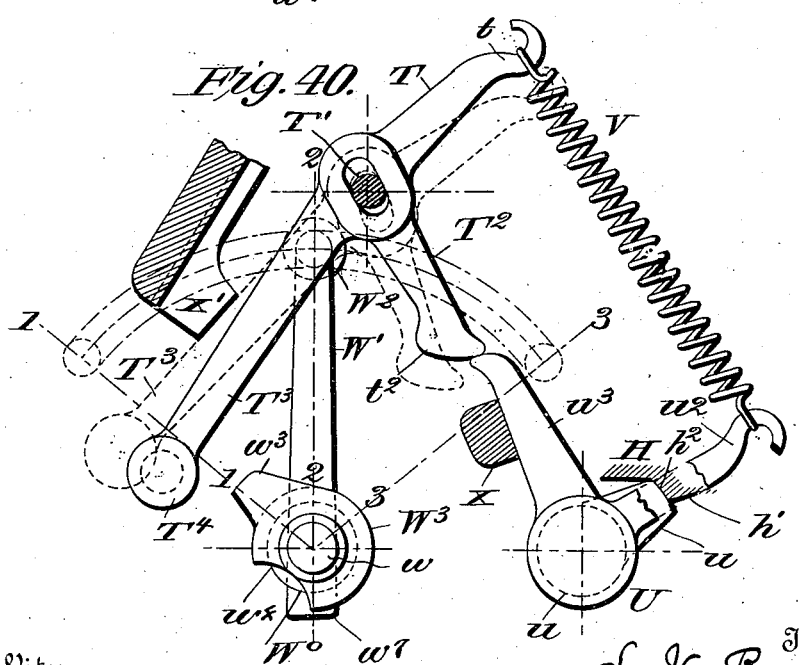

No. 696,306. Patented Mar. 25, 1902.
L. V. BENÉT & H. A. MERCIÉ.
AUTOMATIC GUN.
(Application filed May 2, 1899.)
(No Model.) 16 Sheets—Sheet 16.
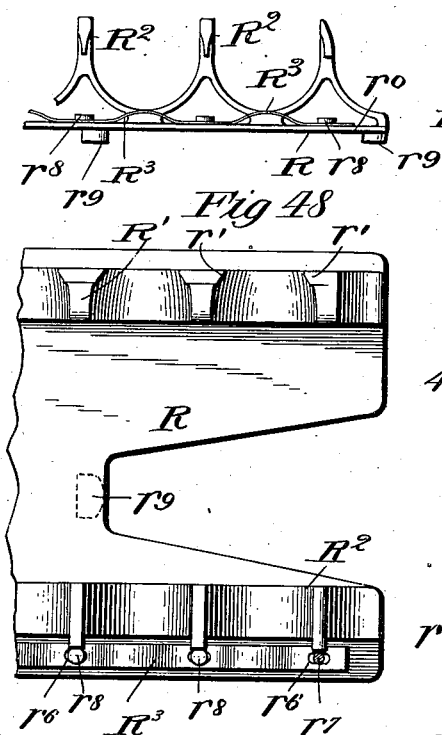
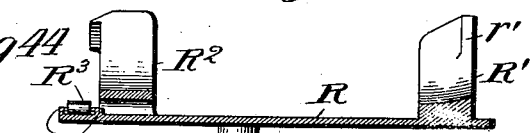
Witnesses
L. C. Hills
Clarence A. Bateman
Inventors
L. V. Benét,
H. A. Mercié,
By Wilkinson + Fisher
Attorneys

UNITED STATES PATENT OFFICE.

LAWRENCE V. BENÉT AND HENRI A. MERCIÉ, OF PARIS, FRANCE.

AUTOMATIC GUN.

SPECIFICATION forming part of Letters Patent No. 696,306, dated March 25, 1902.

Application filed May 2, 1899. Serial No. 715,342. (No model.)

*To all whom it may concern:*

Be it known that we, LAWRENCE V. BENÉT, a citizen of the United States, and HENRI A. MERCIÉ, a citizen of the French Republic, both residing at Paris, France, have invented certain new and useful Improvements in Automatic Guns; and we do hereby declare the following to be a full, clear, and exact description of the invention, such as will enable others skilled in the art to which it appertains to make and use the same.

Our invention relates to improvements in that class of guns in which a portion of the gas developed by the explosion of the powder charge is utilized for operating the breech mechanism of the arm, and more particularly to that class in which a motor-piston in perpetual engagement with a power-accumulator is operated by the gases resulting from the explosion. It is evident, however, that the mechanism about to be described may be applied, in whole or in part, to guns operated by any well-known mechanical means.

The object of our invention is to produce a simple and efficient mechanism whereby when a certain part thereof is given a reciprocating motion by the action of the powder-gas acting in one direction and a spring acting in the opposite direction or by other mechanical means all the operations of loading, firing, extracting, ejecting, and cocking are automatically performed and in proper sequence.

Further objects of our invention are to provide means whereby the gun may be fired continuously or intermittently at the will of the operator and to so form all parts of the mechanism that the same may be dismounted and assembled without the use of tools.

In pursuance of these ends our invention consists in the manner of reinforcing the barrel by means of the breech-housing and of securing it therein; in the manner of securing the breech-housing to the receiver; in the manner of stowing the mainspring or power-accumulator; in the manner of connecting the breech-block and the firing-pin to the motor-piston and of controlling their motions; in the construction of the extractors and in the manner of imparting to them a rectilinear motion; in the manner of gearing the feed-strip directly with the motor-piston, whereby the cartridges are brought to the loading position without the interposition of feed mechanism; in the method of locking the feed-strip when advanced by the piston and of locking the piston in the "cocked" position on the exhaustion of the feed-strip; in the method of unlocking and withdrawing the cartridge from the feed-strip when in the loading position; in the structural features and manner of imparting motion to the ejector; in the structural features and combinations of the various elements of the firing-gear, whereby continuous or intermittent fire may be delivered or the mechanism locked against the danger of accidental discharge, and in the structural features and combinations of various other coöperative parts, as hereinafter described.

Reference is had to the accompanying drawings, in which the same parts are indicated by the same letters throughout the several views.

Figure 14:
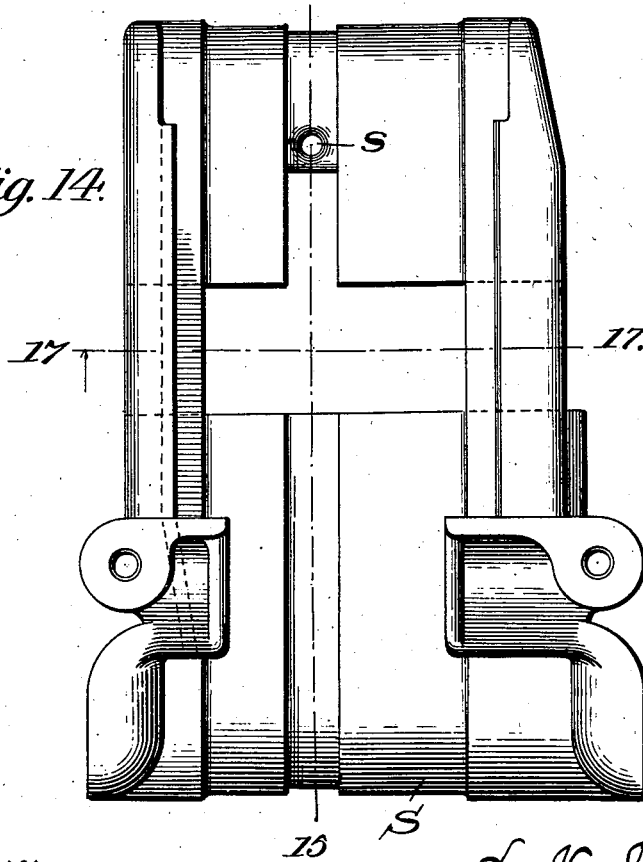

Figure 1 is a central vertical section through the improved gun, the barrel being broken away and parts being shown in elevation. Fig. 2 represents a horizontal section along the line 2 2 of Fig. 1 and looking down. In Figs. 1 and 2 the breech-block is shown in the rear or open position. Fig. 3 represents a section similar to that shown in Fig. 1, except that the breech-block is in the front or closed position. Fig. 4 represents a section similar to that shown in Fig. 3, except that the breech-block is in the front or closed position. Fig. 5 represents a section along the line 5 5 of Figs. 1 and 2 and looking toward the breech of the gun. Fig. 6 represents a section along the line 6 6 of Figs. 1 and 2 and looking toward the breech of the gun. Fig. 7 represents a central vertical section through the casing. Fig. 8 represents a section along the line 8 8 of Fig. 7 and looking down. Fig. 9 is a side elevation of the casing as detached from the gun. Fig. 10 is a plan view of the device shown in Fig. 9. Fig. 11 is a view of the casing shown in Figs. 9 and 10 looking toward the rear of the gun, parts being broken away. Fig. 12 represents a transverse section of the piston along the line 12 12 of Figs. 25 and 26 and looking in the direction of the arrows. Fig. 13 is an end elevation of the feed-trough detached from the gun. Fig. 14 is a plan view of the feed-trough shown in Fig. 13.

Figure 15:
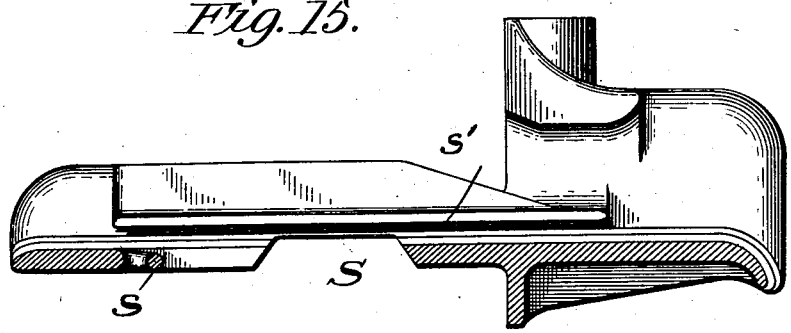
Figure 16:
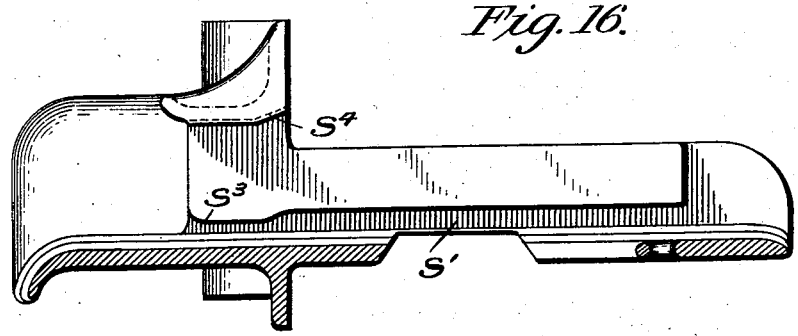
Figure 17:
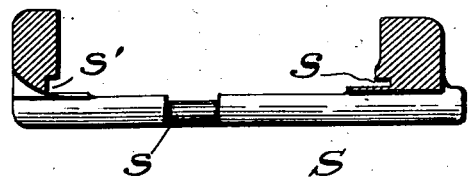
Figure 37:
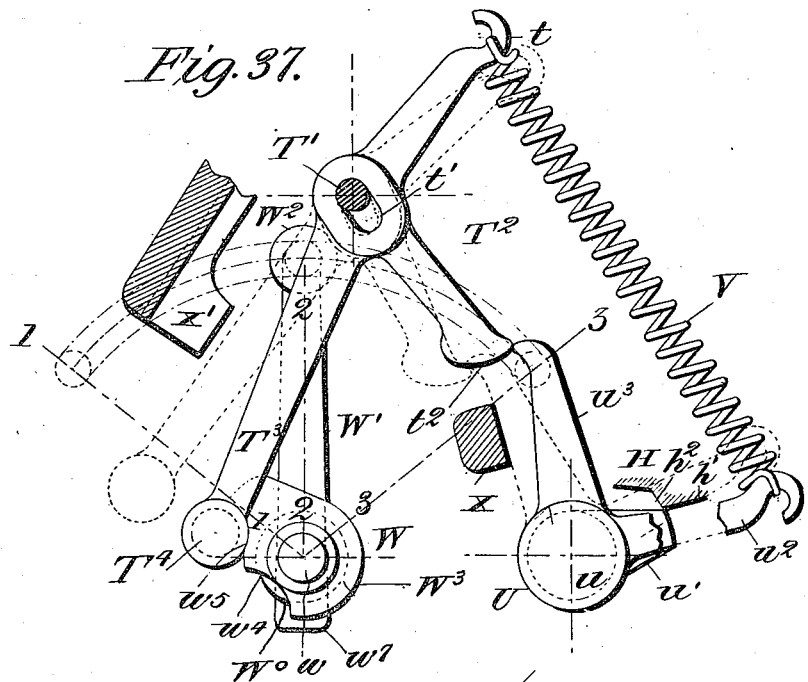
Figure 38:
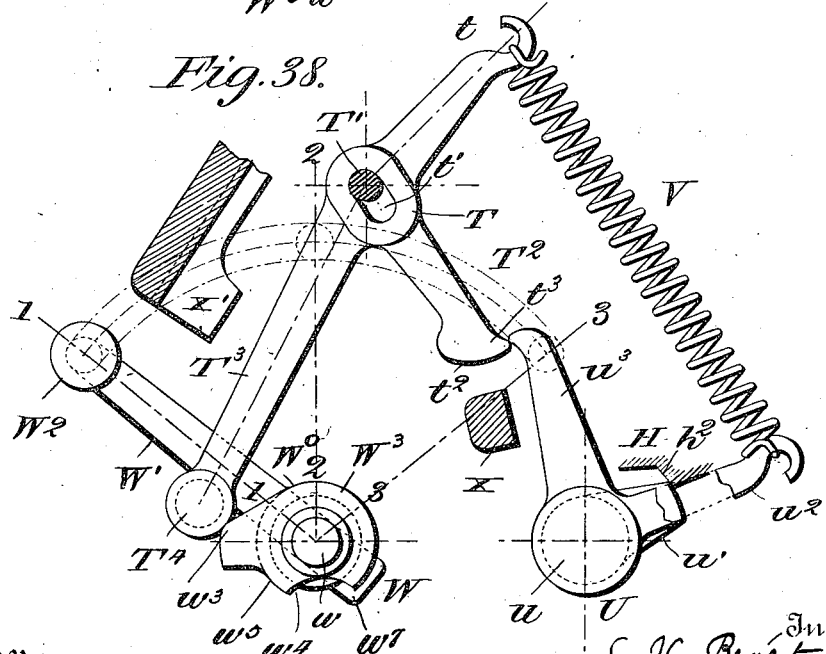

Fig. 15 represents a section from the feed trough along the line 15 15 of Figs. 13 and 14 and looking in the direction of the arrows. Fig. 16 is a section on the same line as that shown in Fig. 15, but looking in the opposite direction. Fig. 17 represents a transverse section across the feed-trough along the line 17 17 of Fig. 14 looking in the direction of the arrows. Fig. 18 is an elevation of the rear end of the breech-piece as detached from the gun. Fig. 19 represents a section along the line 19 19 of Fig. 18 and looking down. Fig. 20 is a rear elevation of the device shown in Figs. 18 and 19. Fig. 21 is a detail, partly in section, showing the coöperation of the piston, breech-block, and the extractors and shows the extractors in the locked or holding position. Fig. 22 is a similar view to that shown in Fig. 21, except that the piston is moved forward slightly, relieving the engagement of the extractors. Fig. 23 is an end view of the device shown in Fig. 21 as seen from the left of said figure. Fig. 24 is a section along the line 24 24 of Fig. 22 and looking in the direction of the arrows. Fig. 25 is a side elevation of the reciprocating piston by means of which the gun is operated. Fig. 26 is a plan view of the piston shown in Fig. 25. Fig. 27 represents the detachable cover for the discharge-opening for the empty shell, which serves to deflect the shell downward. Fig. 28 is a plan view of the device shown in Fig. 27. Fig. 29 is a section along the line 29 29 of Figs. 27 and 28 and looking in the direction of the arrows. Fig. 30 is a detail view showing in perspective the screw-pin for holding the shell-deflector in place on the gun. Fig. 31 is a detail view showing in perspective the pin for holding the breech-cover in place. Fig. 32 is a perspective view of one of the extractors as detached from the gun. Fig. 33 is a perspective view of the pivoted stop as detached from the gun. Fig. 34 is a perspective view of the cocking-handle used for cocking the gun by hand as detached from the gun. Fig. 35 is a perspective view of the pin for securing the rear end of the breech-cover to the casing of the gun. Fig. 36 is a perspective view of the pivoted ejector for ejecting empty or unexploded shell. Figs. 37 to 40, inclusive, represent various positions of the mechanism for controlling the frequency of fire as seen from the left of the gun. Fig. 37 represents the apparatus set for automatic repeated fire or volley-firing. Fig. 38 represents the apparatus set for safety. Fig. 39 represents the apparatus set for single fire. Fig. 40 represents the apparatus in the position showing the return of the detent-lever. Fig. 41 represents a plan view of the feed-strip for holding the fixed ammunition to be used in the gun. Fig. 42 represents a section along the line 42 42 of Fig. 41. Fig. 43 represents an end view of the device shown in Figs. 41 and 42 as seen from the left of said figures. Fig. 44 represents an end view of the device shown in Figs. 41 and 42 as seen from the right of said figures. Figs. 45 and 46 are a side elevation and plan view, respectively, of the resilient strip used to engage the rim of the cartridge-case and hold the shells in place on the feed-strip until the said spring is pressed. Fig. 47 is an end elevation, and Fig. 48 is a plan view, of a device similar to that shown in Figs. 41 and 42, except that the resilient strip is slotted and is fastened and held in place by the heads of rivets instead of traveling in the guideway.

Referring particularly to Figs. 1 to 4, A is the receiver which contains the operative mechanism of the gun, which is preferably a single casting of gun-metal or other material which bears near its forward end the trunnions A' or other device for supporting the gun on its carriage. In the front end of the receiver is screwed or otherwise attached the breech-piece B, which is preferably a single forging of tempered and annealed gun-steel. The rearward portion of the breech-piece is formed into the breech-housing B'. To the front of the breech-housing the breech-piece is provided with an interior screw-thread $b$ and the front of this is slightly coned to receive the barrel C. That portion of the breech-piece which projects from the front of the receiver is formed into a series of annular projections $b'$, which provide a large radiating-surface and assist in absorbing and radiating the heat developed in the barrel by the powder-gases. The barrel C is a single forging of gun-steel and is chambered and rifled in the usual manner. It is solidly assembled with the breech-piece by means of the screw-thread $b$, and the portion which falls under the radiating-surface is coned, so as to be brought into close contact with the latter. When the barrel is assembled with the breech-piece, it bears the same relation to the latter as the tube does to the jacket in a "built-up" gun, in that the breech-piece resists all of the longitudinal strain due to the interior pressure of the powder-gas, while materially reinforcing the barrel against tangential strain. The cylinder support or collar C' is secured to the barrel, to the front of the breech-piece, preferably by shrinkage and by means of the pin $c$. This collar serves to support the forward end of the gas-cylinder D. Through the barrel, cylinder-collar, and cylinder is formed the port $c'$, bringing the bore into communication with the gas-cylinder, and which latter may be circular or of other form in cross-section.

The cylinder D is screwed into the cylinder-collar C', as at $d'$, a coned bearing being formed at $d$ to insure a gas-tight joint. To the rear the cylinder engages in a recess in the front end of the receiver by which it is supported. The front of the cylinder is closed by the regulator D', which consists of a hollowed plug which registers with a relatively long screw-thread $d^2$ in the cylinder D. As the regulator is screwed more or less into the cylinder the volume of the chamber $D^0$, which lies between the regulator and the head of the piston, will be diminished or increased, and hence the tension of the gas entering through the port $c'$ will be increased or diminished, as is described and claimed in our Patent No. 588,380, granted August 17, 1897. To the rear of the chamber $D^0$ the bore of the cylinder is diminished at $d^0$, so as to fit the head of the piston snugly. It is while the head of the piston is moving along this portion that the gas acts effectively upon it. Near the rear end of this reduced portion $d^0$ is the exhaust-port $d^3$, which permits the gas to escape to the open air when unmasked by the movement of the piston. To the rear of this the bore of the cylinder is greatly increased, as at $D^2$, for the sake of lightness.

The piston E (see Figs. 1, 3, 12, 25, and 26) is lodged in the receiver A, its front end engaging in the reduced portion of the cylinder D when in the forward position, as already shown. It has a longitudinal reciprocating motion under the influence of the powder-gas from the barrel acting upon its forward end and the mainspring Z pressing on the piston from the rear. Beginning at the front of the piston we find the cylindrical head $E'$, which receives the pressure of the powder-gas and serves to guide the piston in the cylinder. One or more grooves $e'$ are cut in the head to aid in preventing the passage of gas to the rear. To the rear of the head the piston is reduced in diameter, as at $e^2$, and then increased in diameter, beginning at the shoulder $e^3$. This shoulder serves as an abutment for the stop F, Figs. 1, 3, 5, and 33, which stop engages with it when the feed-strip is exhausted, thus holding the piston to the rear independently of the trigger and retaining-lug, as will be hereinafter described. The central portion of the piston is flattened on top, as shown at $E^2$ in Figs. 12, 25, and 26, and on this plane surface are formed the three cams $e^4$, $e^5$, and $e^6$. (See Fig. 26.) These cams serve to bring the feed-strip to the loading position, as will be described later on. On the right side of the piston is formed the ejector-groove $E^3$, Figs. 1 and 25, which consists of two portions $e^7$ and $e^8$, parallel to the axis of the piston— the inclined portion $e^9$ and the flaring front portion $e^{11}$. (See Fig. 25.) Beneath the piston is formed the cocking-lug $E^4$, against which abuts the head $g$ of the cocking-handle G when cocking the gun by hand. The cocking-handle (see Fig. 34) consists of the body $G'$, on which are formed the four guide-ribs $g'$ and the handle $G^2$. The cocking-handle is mounted loosely in the receiver, the guide-ribs $g'$ engaging in the grooves $a$, Figs. 1, 3, and 7, and the handle projecting through the slot $A^0$, Figs. 1, 3, and 8. When the piston is in its forward position, the lug $E^4$ bears against the head $g$ of the cocking-handle G, and on pulling the latter the piston will be withdrawn to the rear and cocked, if desired. On releasing the piston it flies forward under the impulse of the mainspring Z, pushing the cocking-handle before it. When the piston is thrown to the rear under the pressure of the powder-gas, the cocking-handle remains in its forward position, (shown in Fig. 3,) not partaking of the motions of the piston.

To the rear of the cocking-lug is the retaining-lug H, Figs. 1, 3, and 15, which is a single piece fitted into a dovetail recess in the under side of the piston. It is provided with a central pivot or stem $h$ to facilitate assembling with the piston.

Within the piston is formed the longitudinal chamber $E^5$, in which is lodged the mainspring Z. This spring abuts against the bottom of the chamber in one direction and against the breech-cover $A^2$ in the other. Between the rear end of the mainspring and the breech-cover the head of the guide-rod $Z'$ is interposed, the spring bearing against the flange of the head $z$ of this guide-rod and the head against the breech-cover $A^2$. This guide-rod is preferably hollow, and its object is to keep the mainspring in line when the piston is in its forward position and the greater part of the mainspring unsupported by the walls of the chamber $E^5$ in the piston.

Near the rear of the piston is formed the head $E^6$, which is bored axially to receive the stem $K'$ of the breech-block K. (See Figs. 1, 3, 21, and 22.) The grooves $e^{16}$ are cut through the head $E^6$ to permit the passage of the tenons $k^{16}$ at the rear of the breech-block. The head of the piston is bored transversely at $e^{12}$ for the passage of the pin L, which traverses the head $E^6$ of the piston, the stem $K'$ of the breech-block, and the enlargement $M'$ of the firing-pin M and controls the motion of the breech-block and firing-pin. The pin L is provided at one end with the ears $e$, Figs. 2, 4, and 25, which are seated in recesses in the head of the piston, their object being to afford a long bearing against the walls of the receiver and to prevent the pin from slipping out of place during the movement of the piston. Finally, the head $E^6$ of the piston is provided with cams $e^{15}$, Figs. 21 and 22, with the object of controlling the action of the extractors, as will be described later on.

The breech-block K, Figs. 5, 6, 21, and 22, is provided to the front with the two lugs $k$, which resist the pressure delivered by the head of the cartridge when the breech is closed and which act as guides during the longitudinal motion of the breech-block when opening or closing. When the breech is closed, the lugs $k$ are horizontal and bear against the shoulders $b^2$ of the breech-piece B in rear of the housing $B'$. (See Figs. 2, 4, and 18 to 26.) When the breech is unlocked by turning it through ninety degrees about its longitudinal axis, the lugs $k$ register with the slots $b^3$, and the breech-block is free to move to the rear. The lugs then engage in the guideways $a'$, Figs. 5 and 6, in the receiver, which prevent rotation of the breech-block throughout the remainder of its movement. By this arrangement the breech-block cannot move longitudinally when the lugs $k$ are engaged behind the shoulders $b^2$ in the housing B' of the breech-piece, and when engaged therein it can only rotate axially, as the conical surface $k^3$ of the head abuts against the surface $b^3$ to the front, and the lugs $k$ abut against the shoulders $b^2$ to the rear. These motions of rotation and translation are controlled by the piston acting upon the breech-block through the pin L, which traverses the stem of the breech-block, passing through the cam-slots $K^0$. When the breech is closed and locked, the piston is in its extreme forward position, the forward surface $e^{14}$ of the piston-head bearing against the annular abutment $k^5$ on the breech-block, Figs. 3, 4, and 21 and 22. The pin L is then in its extreme forward position with reference to the slots $K^0$, and the firing-pin M, which is also traversed by the pin L, is in its forward position, its point projecting beyond the front face of the breech-block through the hole $k^6$, the parts then being in the position shown in Figs. 3 and 4. On the piston moving to the rear under the impulse of the powder-gas the pin L moves to the rear along the cam-slots $K^0$. The forward portion of these slots is essentially parallel to the axis of the breech-block, and during this portion of the movement the pin L withdraws the firing-pin, while the breech-block remains fast. The pin L then reaches the spiral portion of the cam-slots $K^0$, which make a gradually-increasing angle with the axis of the breech-block. As the breech-block cannot at first move to the rear, it rotates about its axis, disengaging the lugs $k$ from the shoulders $b^2$ and unlocking the breech. The gradually-increasing angle which the cam-slots $K^0$ make with the axis of the breech-block enables the pin L to exert great power upon the breech-block during the first part of the movement of unlocking, thus avoiding liability to stick or jam. When the pin L reaches the end of the spiral portion of the slots $K^0$, the block is fully unlocked. The lugs $k$ are then vertical and in line with the slots $b^3$ and the guideways $a$, and the breech-block is in position to be withdrawn. At this time the slots $K^0$ become parallel to the axis for a short distance, during which portion of the movement the extractors are locked, as will be explained later on. When the pin has reached, essentially, the end of the slots, the lugs $k^{16}$ are struck by the rear surface of the head $E^6$ of the breech-block and the block is withdrawn, thus fully opening the breech.

The firing-pin M is preferably a single piece and is lodged in the breech-block, as already described, and is provided with the usual point and with the swell M', through which passes the pin L. To the rear of the swell M' it is prolonged by the part $M^2$ for the purpose of preventing the assembling of piston, breech-block, firing-pin, and pin without passing the latter through the hole in the swell M'. For convenience in assembling this part $M^2$ terminates in a knurled boss $m^2$. From the description already given of the breech-block it will be evident that the point of the firing-pin cannot project beyond the face of the breech-block and fire the cartridge until the breech shall have been fully closed and locked. It will also be evident that the firing-pin will be withdrawn until the point is within the breech-block before the latter can begin to unlock. This insures safety against premature discharge. It will also be noted that the cartridge will be discharged the instant the breech is closed and locked and before the barrel when highly heated by prolonged firing can have any effect upon the powder contained in the cartridge.

The breech-block is fitted with two independent extractors P, Figs. 1, 3, 21 to 24, and 32; but as these are symmetrical in form and identical in action a description of one will suffice for both. They are preferably of the rigid type and perform their function without calling upon the resilience of the material of which they are made. To the front of the extractor is formed the rib or claw $p$ for grasping the head of the cartridge, and to the rear of the claw is the abutment $p'$, which prevents the claw from approaching too near to the axis of the breech-block. The projection $p^2$ prevents the front face of the lower extractor from striking the primer of the cartridge when forcing it into the chamber of the barrel, as will be described later on.

The body P' of the extractor engages in and registers with the groove $a^3$ in the receiver and $b^4$ in the breech-piece, which permits it a motion of translation, but not of rotation. Below the body is formed the hook $p^3$, which engages in front of the annular rib $k^7$ on the breech-block K and forms the connection between these two pieces. To the rear of the hook $p^3$ is formed the U-shaped tang $P^2$, which engages to the rear of the rib $k^7$ on the breech-block and bears against the rear surface of this rib on either side thereof, as shown at $p^4$ in Figs. 21 and 22. These points $p^4$ are closer to the axis of the breech-block than the claw $p$, and hence any longitudinal tension on the tang will tend to make the claw approach the axis. To the rear the body of the extractor is prolonged into the tail $P^3$, which is bent inward slightly, as at $P^5$, and bears upon the head of the piston.

The action of the extractors will now be explained. Consider the piston to be in its rearmost position, as shown in Fig. 21. The tails of the extractors will bear on the cams $e^{15}$ of the piston and the abutments $p'$ will bear against the head of the breech-block. The extractors will therefore be held by means of the three bearings $p'$, $p^3$, and $p^5$. Suppose a cartridge to be in line with and ready to enter the chamber of the barrel. As the piston moves forward the breech-block will remain fast until the pin L reaches the spiral portion of the grooves $K^0$, and during this part of the motion the cams $e^{15}$ on the piston will move forward with reference to the tails of the extractors until the parts $p^5$ and $e^{15}$ are in the position shown in Fig. 22. The extractors will then be free to pivot about the U-shaped tangs $P^2$, and thus pass over the flange of the cartridge. The pin L then having struck the spiral portion of the grooves $K^0$, the piston and the breech-block move forward together, and the lower extractor striking the head of the cartridge pushes it into the chamber. After the discharge the piston moves to the rear, unlocking the breech-block, as already described. When the breech-block is unlocked, but before it moves to the rear, the pin L passes along the straight portion of the cam-slots $K^0$, and during this motion the cams $e^{15}$ pass under the tails of the extractors and force the claws $p$ to engage positively with the flange of the cartridge. As the breech-block moves to the rear the cartridge is extracted, the effort of extraction tending to cause the extractors to revolve about the points $p^4$ of the U-shaped tangs $P^2$, and thus to grasp the cartridge more firmly.

The ejector consists of a single piece Q, Figs. 1, 26, and 36, which is lodged and works in a transverse slot $a^4$ in the receiver. The lower portion $Q'$ of the ejector is formed so as to embrace one side of the body of the piston, and on this part is formed the coffin-shaped stud $Q^2$, which engages in the ejector-groove $E^3$ in the piston. The head $Q^3$ of the ejector is conformed to the radius of the cartridge-case so as to strike it on a relatively large surface, and to the rear of the head is formed the abutment $q^3$ to limit the backward motion. Considering the piston to be in its extreme forward position, the ejector-stud $Q^2$ is in the straight portion $e^8$ of the ejector-groove $E^3$, and during the first portion of the rearward motion of the piston it remains inoperative in the slot $a^4$ in the receiver. When the piston has moved sufficiently to the rear to bring breech-block and extractors, and with them the empty cartridge-case, in line with the ejector-aperture $A^4$ in the casing, the inclined portion of the ejector-groove $e^9$ strikes the ejector-stud $Q^2$ and causes the ejector to pivot about the piston. The ejector-head strikes the cartridge-case and forces it out of the grasp of the extractors and into the deflector $A^5$, from which it falls to the ground. In order to allow the shell to be knocked out of the extractors, the nibs of the latter are cut away on one edge, as shown at $p^6$ in Fig. 23. As the piston moves forward the inclined portion of the ejector-slot causes the ejector to pivot to the rear into the slot $a^4$, where it remains until another cartridge-case reaches the ejection position.

The deflector $A^5$ is preferably suspended by a rib $a^{15}$, engaging a corresponding surface on the receiver A, (see Fig. 5,) and is detachably connected to the casing by the thumb-screw $a^{16}$, Fig. 30, passing through the slot $a^{17}$, Fig. 27.

Before describing the operations of feeding it will be necessary to explain the construction and function of the feed-strip, as this forms a coöperative part of the feed mechanism. (See Figs. 5 and 41 to 48.) The feed-strip consists, preferably, of a single casting R, of bronze or other metal, and holds ten or such other number of cartridges as may not exceed a suitable weight for quick handling. To the front of the strip are formed a series of clips $R'$, which embrace the ogival heads of the projectiles. They are provided with a slightly-overhanging lip $r'$, so formed that when the cartridge is slightly withdrawn to the rear the projectile is freed from the clips. To the rear of the strip is formed the series of clips $R^2$, which grasp the shell of each cartridge. The cartridges are prevented from moving to the rear by means of the resilient undulating strip of thin metal $R^3$, which is provided with ears $r^3$ to engage in guides $r^4$, attached to or integral with the plate R. These undulations being in line with the rims of the cartridges prevent them from moving to the rear. The end lug $r^3$ is pressed into the enlarged opening $r^5$, as shown in Fig. 41, and thus the strip is held in place. Instead of this method of securing the strip in place the latter may be provided with elongated holes $r^6$, engaging the stems $r^7$ of rivets having enlarged heads $r^8$, so as to permit of a slight longitudinal motion of the strip $R^3$. In either case if pressure be brought to bear upon an undulation from above it will be flattened down and the cartridge may be withdrawn to the rear. On the under side of the feed-strip are formed the lugs or tenons $r^9$, which engage with the feed-cams $e^4$, $e^5$, and $e^6$ on the top of the piston already described. They also register with the tooth $f^3$ on the stop F, which serves as a pawl to prevent the withdrawal of the feed-strip when not engaged with the feed-cams. The feed-strip is prolonged beyond the emplacement of the first cartridge, as at $r^0$, to provide an extra tenon, and under the last cartridge is provided the clearance $R^0$ to permit the action of the stop F. This stop F is carried in the journal-bearings $a^6$, Figs. 5 and 33, in the receiver by means of the trunnions $f'$. The opening in the journal-bearings $a^6$ is made smaller than the maximum diameter of the trunnions $f'$, and the trunnions are flattened on the sides, as shown in Figs. 5 and 33, so that they may be slipped into the journal-bearings and the stop swung upward into place, when it will be securely held. When swung into place, the spiral spring $F^0$ is engaged with the hook $f^2$ on the stop and the eyes on the feed-trough S, which holds said stop securely and tends to pull it upward. Under the trunnions $f'$ is the handle $F'$, by means of which the stop may be swung downward out of engagement with the piston when desired. On the upper part of the stop are formed the cam-surface $f^3$ and the two ratchet-teeth $f^4$ and $f^5$. If there be no feed-strip in the gun, the stop is free to swing upward until its body strikes the under surface of the piston. If now the piston be in its rearward position and if there be no feed-strip engaged in the gun, the stop will be held against the under surface of the piston by the tension of the spring $F^0$. If the piston be withdrawn to the rear, when the abutment $e^3$ falls in line with the stop the latter will rise under the influence of the spring and will prevent any forward movement of the piston, and this quite independent of the trigger. If now a feed-strip be inserted in the feed-trough guides $s'$ and pushed home, the front of the strip will strike the cam $f$ on the stop, forcing it down to the level of the under side of the feed-strip, and free the piston. Hence while the feed-strip is in the gun the stop is inoperative. When the last cartridge is loaded into the gun, the opening $R^0$ in the feed-strip falls above the stop and the latter rises, and when the piston is thrown to the rear by the gas of the last cartridge the stop prevents it from going forward until a fresh feed-strip shall have been inserted or until the stop is released by hand.

Returning now to the feed-strip, it will be noticed that the tenons $r^9$ are spaced by distances equal to the distance between the axes of adjacent cartridges. On the stop the ratchet-teeth $f^4$ and $f^5$ are spaced by essentially half this distance. Referring now to Fig. 5, we see that when the feed-strip is inserted into the gun and forced home the tooth $f^4$ engages behind the first tenon $r^9$ and prevents any movement in withdrawal of the feed-strip. The feed-strip, as already remarked, is inserted when the piston is to the rear. As the piston moves forward under the influence of the mainspring the feed-cam $e^4$ strikes the second tenon and causes the feed-strip to advance until the cartridge is in the loading position. As the piston moves to the rear the feed-cam $e^5$ strikes the third tenon and advances the feed-strip by one-half space, when the second tenon is engaged by the tooth $f^5$ and a backward movement prevented. As the piston moves forward again the third tenon is struck by the feed-cam $e^4$ and advanced a further half-space, when the tooth $f^5$ engages the second tenon, and so on.

The feed-trough S is made in a separate piece from the receiver to facilitate manufacture and is secured in place by the taper pins $s^2$ $s^2$. It is shaped to facilitate the introduction of the feed-strips and is provided with the guides $s'$, in which are engaged the edges of the feed-strip for the purpose of holding it steady. The rear one of these guides $s'$ is so formed that a downward-inclined projection $s^3$ strikes each undulation of the thin-metal strip as they arrive at this point, thus permitting each successive cartridge to be drawn to the rear. In the upper part of the feed-box is formed the guide $s^4$, which is inclined to the rear and which engages the flange of each successive cartridge. As each undulation of the strip is forced down, as already described, each successive cartridge is withdrawn to the rear by the guide $s^4$, thus freeing it from the clips $R'$. At this moment the cartridge rides up on the tongue $A^8$, which is formed in the receiver, and being pushed along by the clips $R'$ is brought into the loading position in line with the breech-block. In this position it is struck by the projection $p^2$ on the lower extractor and is forced into the chamber of the barrel. The inclined surfaces in the breech-housing of the breech-piece serve as guides to direct the cartridge fairly home. It will also be observed that the cartridge is firmly held and guided between the clips $R'$ and the walls of the receiver. If during the firing of a feed-strip of cartridges it is necessary to cease firing and unload the gun, it is only necessary to turn down the stop by means of the handle, when the ratchet-teeth will be withdrawn from engagement with the tenons and the feed-strip may be freely withdrawn.

The rear of the receiver is closed by the breech-cover $A^2$, which provides a support for the shoulder-piece O. The breech-cover is a single casting and is assembled to the receiver by means of the pivot-bolt $a^8$ and the breech-cover pin $A^7$, which pin is provided with the stud $a^9$, which engages in the grooves $a''$ in the breech-cover, Figs. 2 and 4, so that by giving a half-turn to the spring-handle $a^{12}$ the stud $a^9$ falls in line with the groove $a''$ and the pin may be withdrawn. When the pin is withdrawn, the breech-cover may be rotated about the pivot-bolt $a^8$ and the interior of the receiver exposed for the dismounting or assembling of the component parts of the mechanism.

When the breech-cover is opened, the firing-gear is exposed. This, as shown in Figs. 3 and 37 to 40, comprises the firing-lever T, the trigger-piece U, the trigger-spring V, and the controlling-lever W, all of which are mounted in the receiver. The trigger U consists of the shaft $u$, on which is formed the trigger proper, $u'$, and at the end of which shaft is the spring-lever $u^2$ and the firing-toe $u^3$. The trigger-spring V is under tension between the spring-lever $u^2$ and the tail $t$ of the firing-lever T. The said spring tends to turn the trigger upward until stopped by the firing-toe $u^3$ striking the abutment X on the receiver, as shown in full lines in Fig. 40. Moreover, the same spring tends to cause the firing-lever arm $T^3$ to engage against the stop $X'$, as shown in dotted lines in Fig. 40. As the piston moves to the rear or to the right in Figs. 37 to 40 the inclined surface $h'$ of the lug H strikes the trigger and causes it to rotate downward against the tension of the spring V. When the lug has passed over the trigger, the latter rises and, engaging the shoulder $h^2$, prevents the piston from moving to the front. (The trigger may be dismounted by opening the breech-cover, disengaging the trigger-spring, turning the piece until the trigger proper falls in line with the slot $a^{18}$, Fig. 7, cut into the side of the receiver, and withdrawing.)

The firing-lever T is pivoted on the pin T' on the exterior of the receiver and plays between it and the cheek of the breech-cover. The journal-bearing $t'$ for the lever T is elongated about two diameters in the direction of the axis of the trigger-arm $T^2$, which arm has the rounded edge $t^2$, adapted to strike back upon and pass over the toe $u^3$, and the engaging edge $t^3$, adapted to engage the toe $u^3$ when rotated in the opposite direction. On the branch $T^3$ of the firing-lever is the firing-handle $T^4$, which is grasped by the operator of the gun. When the breech-cover is opened, the firing-lever may be slipped off its pivot and dismounted.

The controlling-lever W has an arm W' on the spindle $w'$, which spindle is prolonged to form the handle $W^0$. This is grasped by the operator at the same time as the firing-handle, and by bringing the two toward each other by a pressure of the fingers he is enabled to fire the gun. On the spindle $w$ is formed the controlling-stop $w^3$, the function of which will be described later on. The controlling-lever is mounted by slipping into its journals in the receiver, and then inserting the spring-handle $W^2$, swinging this upward, the stud $w^7$ engages in a groove in the receiver, forming a bayonet-joint, and while so engaged the handle cannot be withdrawn.

The action of the firing-gear is as follows: Suppose it be desired to lock the gun at safety. The controlling-lever handle $W^2$ is turned to the position marked "safety." (Indicated by the line 1 1 of Figs. 38 to 40.) If now the firing-handle be pulled toward the spindle $w$, as for firing, the arm $T^4$ will strike the abutment $w^3$ (see Fig. 38) on the controlling-stop $W^3$, and the motion of the firing-lever will be arrested before the arm $T^2$ can move the toe $u^3$ far enough to release the trigger $u'$ from engagement with the notch $h^2$, and hence the gun cannot be fired while the controlling-lever is in the position 1 1. Now suppose it is desired to fire single shots, pausing after each shot to correct the aim or for other reasons. The controlling-lever is turned until the handle $W^2$ is in the position marked "slow fire." (Indicated by the line 3 3 in Figs. 37 to 40.) The recess $w^4$ in the controlling-stop $W^3$ now registers with the firing-handle $T^4$, and the latter may be moved against the action of the spring V until in contact therewith or in the position shown in Fig. 39. As the firing-lever is pulled toward the spindle $w$ the trigger-lever $T^2$ presses against the firing-toe $u^3$, causing the trigger-piece U to rotate until the trigger $u'$ escapes from the notch $h^2$ and allows the piston to fly forward, (to the left in Figs. 37 to 40,) firing the gun. At this point further movement of the trigger is arrested by the trigger $u'$ striking the abutment $y$, (see Figs. 1 and 3,) formed in the receiver. The point of the tripping-arm $T^2$ then bears against the point of the firing-toe $u^3$, as shown in full lines in Fig. 39, until the firing-toe escapes from the tripping-arm, and the tension of the trigger-spring V causes the trigger-piece U to resume its first position, (shown in dotted lines in Fig. 39;) but the tripping-arm $T^2$ will then be out of engagement with the cocking-arm. On the recoil of the piston the trigger will again engage with the notch $h^2$ and hold the piston to the rear, as before, except that the tripping-arm $T^2$ will now be back of the firing-toe $u^3$, and in order to fire a second shot it will be necessary to first release the firing-lever, when the cam-surface $t^3$ on the tripping-arm will strike the cam-surface $u^4$ on the firing-toe, and the tension of the trigger-spring will cause the elongated journal $t'$ to ride up on the pivot T', when the tripping-arm will slip over and engage in front of the firing-toe, and the firing-lever will resume its initial position against the abutment X', ready for another shot.

If it be desired to fire continuously, the controlling-lever is turned until the handle $W^2$ takes the position marked "vollies." (Indicated by the line 2 2 in Figs. 37 to 40.) The portion $w^5$ of the controlling-stop will now register with the firing-handle, the firing position being shown in full lines in Fig. 37. If the firing-handle be now pulled to the rear, it will strike the surface $w^5$, as shown in Fig. 37, and the tripping-arm will hold the trigger out of engagement with the lug H, and the firing-handle being held in this position the gun will fire continuously as long as it is supplied with ammunition. In this position of the controlling-lever the firing-handle cannot be pulled far enough to the rear to permit the tripping-arm to spring beyond the firing-toe, but will permit sufficient movement to hold the trigger out of engagement with the retaining-lug H.

To explain the general action of the mechanism, let us consider the breech to be closed and the controlling-lever set at "slow fire." The cocking-handle $G^2$ is grasped by the operator and drawn smartly to the rear. The head of the cocking-handle bearing against the cocking-tang $E^4$ on the piston withdraws the latter, and the breech is unlocked and opened. When the inclined surface $h'$ of the lug H strikes the trigger $u'$, it forces this down, and when the lug has passed the trigger flies up under the action of the spring V and prevents a forward movement of the piston. The piston moving slightly further to the rear, the stop F rises and engages in front of the abutment $e^3$, and the gun is at full-cock, with the mainspring fully compressed. It is now impossible to fire the gun by pulling the firing-lever, as the piston is held by the stop F independently of the trigger. The gun is now loaded by engaging a feed-strip R in the guides $s'$ of the feed-trough S and pushing it smartly home. (See Fig. 5.) The first tenon $r^2$ of the feed-strip strikes the cam-surface $f$ on the head of the stop F, causing the latter to revolve about its axis $f'$ against the action of the spring $F^0$ and disengage itself from the abutment $e^3$ on the piston. The piston now moves slightly forward until the lug $h^2$ engages on the trigger $u'$. As the feed-strip is entered in the feed-trough the projection $s^3$ presses down the first undulation of the thin metal strip on the feed-strip and leaves the first cartridge free to move to the rear. The flange of this cartridge has in the meantime engaged in the inclined groove $s^4$ of the feed-box, and the cartridge is withdrawn to the rear until it is free vertically from the clips R' and $R^2$. The point of the tongue $A^8$ has now passed under the cartridge, and as the feed-strip is pushed into the gun the cartridge rides up on the tongue until it abuts against the wall of the receiver at $a^{08}$. Just before the cartridge abuts against the wall of the receiver the second ratchet-tooth $f^5$ on the head of the stop F engages with the first tenon on the feed-strip and prevents any backward movement of the latter. The gun is now loaded and ready to fire. The operator now pulls the firing-lever smartly to the rear until the firing-handle $T^1$ is stopped by striking the bottom of the recess $w^4$ in the controlling-stop $W^3$. The tripping-arm $T^2$ pressing up on the firing-toe $u^3$ causes the trigger $u'$ to revolve until free of the notch $h^2$, and the tripping-arm escaping from engagement with the firing-toe $u^3$ passes to the rear of the latter. The trigger-spring V now causes the trigger to resume its original position. When the trigger $u'$ is free from the notch $h^2$, the piston flies forward under the impulse of the mainspring Z. As the piston moves forward the pin L moves along the straight portion of the grooves $K^0$ in the breech-block. (See Figs. 21 to 24.) The breech-block remains fast, but the cams $e^{15}$ on the head $E^6$ of the piston move forward with reference to the tails $p^5$ of the extractors P, leaving the extractors free to revolve slightly about the faces $p^4$ of the tangs $P^2$. As the piston continues its forward motion the pin L passes into the inclined portion of the grooves $K^0$ in the breech-block, and as the latter is prevented from turning by the tenons $k$ engaging in the guideways $a'$ in the receiver the breech-block moves forward with the piston. As the breech-block moves forward the projection $p^2$ on the lower extractor strikes the head of the first cartridge and forces it into the chamber of the gun. As the cartridge moves into the chamber it is guided by the wall of the receiver, the clips R' and $R^2$, and the inclined plane $A^8$. When the cartridge is fully home, the flange is struck by the inclined surfaces of the front ends of the extractors, causing the latter to rotate slightly about the hooks $p^3$, so as to bring the claws or nibs $p$ into engagement with the flange of the cartridge. At this moment the motion of the breech-block to the front is arrested by the coned surface $k^3$ of its head striking the corresponding surface $b^3$ in the breech-piece B. The tenons $k$ on the breech-block having now entered the chamber B' in the breech-piece, the block is free to revolve about its axis. As the piston continues its motion to the front the pin L moves along the inclined portion of the slots $K^0$ in the breech-block, causing the latter to rotate and bringing the tenons $k$ in line with the abutments $b^2$ in the breech-piece, and the breech is locked. The pin L now enters the short straight portion at the front end of the slots $K^0$, and the piston continuing its forward motion forces the firing-pin M against the primer of the cartridge and fires the gun. The piston is now stopped by the front face of the head $E^6$ striking the annular abutment $k^5$ on the breech-block. As the piston moves forward the feed-cam $e^4$ on the piston engages behind the second tenon on the feed-strip, holding the latter in the loading position. When the projectile has moved along the bore sufficiently to unmask the port $c'$ in the barrel, (see Figs. 1 and 3,) a portion of the powder-gas passes into the chamber $D^0$ in the gas-cylinder D and impinging against the head E' of the piston throws the latter to the rear. When the piston has moved sufficiently to the rear to unmask the exhaust-port $d^3$, the gas escapes into the open air. As the piston moves to the rear the pin L, moving first along the short straight portion at the front end of the slots $K^0$ in the breech-block K, withdraws the firing-pin M clear of the face of the breech-block, and the said pin L then strikes the inclined portion of the slots K, and as the breech-block is prevented from moving to the rear by the tenons $k$ bearing against the abutments $b^2$ the breech-block rotates about its axis until the tenons $k$ register with the guideways $b^3$, when the breech-block is unlocked. At this time the pin L passes into the straight portion of the slots $K^0$ in the breech-block, and as the pin moves along this portion the cams $e^{15}$ on the piston-head $E^6$ pass under the tails $p^5$ of the extractors, causing these pieces to rotate about the hooks $p^3$ and holding the claws $p$ in positive engagement with the flange of the cartridge-case. At this point the rear face of the piston-head $E^6$ strikes the tenons $k^{16}$ at the end of the breech-block, and the latter is dragged bodily to the rear by the piston, dragging with it the empty cartridge-case held firmly in the extractors. As the piston moves to the rear the stud $Q^2$ on the ejector Q moves along the straight portion $e^8$ of the ejector-groove $E^3$ on the piston. When the breech-block has moved sufficiently to the rear to bring the empty cartridge-case in line with the ejection-aperture A, the ejector-stud $Q^2$ strikes the inclined part $e^9$ of the ejector-groove, and the ejector revolves about the piston. The ejector-head $Q^3$ now strikes the empty cartridge-case and forces it out of the grasp of the extractors and into the deflector $A^5$, from whence it falls to the ground. As the piston moves to the rear the feed-cam $e^5$ engages behind the third tenon on the feed-strip R and causes the latter to advance by one-half space into the feed-trough. At this point the first ratchet-tooth $f^4$ engages behind the second tenon and holds the strip in place. When the piston is fully to the rear, the trigger engages with the lug H, holding the piston at full-cock, ready for the next shot. The operator now releases the firing-handle, when the tripping-arm will engage in front of the firing-toe, as already explained, and by operating the firing-lever the gun may be fired. As the piston again moves forward the feed-cam $e^4$ strikes the third tenon of the feed-strip and advances the latter one-half space, this bringing the second cartridge to the loading position before it can be struck by the lower extractor. When the last cartridge on a strip is brought to the loading position, the stop F is permitted to rise by the opening $R^0$ in the feed-strip, and as the piston is forced to the rear by the gas of the last cartridge the stop rises and prevents a forward movement of the piston until a fresh feed-strip shall have been loaded into the feed-trough.

The cycle of operations is the same for volley-firing except that the firing-lever is held in the firing position until it is desired to cease firing.

When a fresh feed-strip is inserted, the lugs $r^9$ may not be in exact alinement with the cam-surface $e^4$, and so we provide the cam-surface $e^6$, (see Fig. 26,) which engages the first lug $r^9$, and thus the first forward movement of the piston moves the feed-strip so that it may be in operative engagement with the cams $e^4$ and $e^5$, after which it is kept in engagement by means of the teeth $f^4$ and $f^5$ in the stop F, as has been already described.

To dismount the mechanism, proceed as follows: Turn the breech-cover pin half a turn to the rear and withdraw, swing breech-cover about pivot-bolt until it rests on top of receiver, unhook trigger-spring from trigger-piece and firing-lever, remove firing-lever, withdraw trigger-piece, swing handle of controlling-lever out of groove and slip out spindle, withdraw spindle of controlling-lever, withdraw mainspring guide-rod and mainspring, withdraw piston and breech-block, withdraw pin in piston-head, give a quarter-turn to breech-block and remove from piston, drop out firing-pin, unhook and remove extractors, slide ejector out of seat, unhook stop-spring, swing stop downward, and slide trunnions out of journals.

To assemble the mechanism, proceed in the reverse order.

It will be noted that the various parts of the mechanism are so arranged as to be held securely in place and yet to be readily dismounted or assembled without the use of tools.

It is evident that many features of our invention are capable of employment and can be used in guns of different construction and mode of operation from the gun shown in our drawings, and we do not limit ourselves to their use in such combination alone. Moreover, it is obvious that many changes might be made in the herein-described construction which could be used without departing from the spirit of our invention.

What we claim as new, and desire to secure by Letters Patent of the United States, is—

1. In a breech-loading gun, the combination with a barrel, and a breech-block chamber, of a hollow breech-block with cam-grooves therein, a reciprocating motor-piston provided with a sleeve inclosing said breech-block and a pin mounted in said sleeve and projecting through the cam-grooves in the breech-block for first rotating to unlock and then withdrawing said breech-block, from said chamber, and for returning and locking the same, substantially as described.

2. In a gas-operated breech-loading gun, the combination with a breech-block chamber, of a barrel, a cylinder connected to said barrel, a motor-piston mounted in said cylinder and actuated rearward by the gases of discharge, a sleeve on the heel of said motor-piston, a mainspring for moving said piston in the reverse direction, a hollow breech-block with cam-grooves therein and a pin mounted in said sleeve and projecting through the cam-grooves in the breech-block for first rotating to unlock and then withdrawing said breech-block from said chamber, and for returning and locking the same, substantially as described.

3. In a breech-loading gun, the combination with a barrel and a breech-block chamber, of a breech-block adapted to rotate and lock or unlock in and to move longitudinally into and out of said chamber, with cam-grooves on said breech-block, of a reciprocating motor-piston provided with a hollow sleeve parallel to the axis of said piston and inclosing said breech-block, a pin passing through said hollow sleeve and through the cam-grooves in said breech-block, and a firing-pin mounted in the hollow breech-block and positively connected to said piston, substantially as described.

4. In a breech-loading gun, the combination with a barrel, and a breech-block chamber, of a breech-block, a reciprocating motor-piston, means operated by said piston for first rotating to unlock and then withdrawing said breech-block, from said chamber, and for returning and locking the same, and extractors pivoted on said breech-block and operated by said piston, substantially as described.

5. In a gas-operated breech-loading gun, the combination with a breech-block chamber, of a barrel, a cylinder connected to said barrel, a motor-piston mounted in said cylinder, a mainspring for moving said piston in the opposite direction, a breech-block, means operated by said piston for first rotating to unlock and then withdrawing said breech-block from said chamber, and for returning and locking the same, and extractors pivoted on said breech-block and operated by said piston, substantially as described.

6. In a breech-loading gun, the combination with a barrel, and a breech-block chamber, of a breech-block, a reciprocating motor-piston, a cam engagement between said piston and said breech-block for first rotating to unlock and then withdrawing said breech-block from said chamber and for returning and locking the same, and extractors pivoted on said breech-block and operated by said piston, substantially as described.

7. In a gas-operated breech-loading gun, the combination with a breech-block chamber, of a barrel, a cylinder connected to said barrel, a motor-piston mounted in said cylinder, a mainspring for moving said piston in the opposite direction, a breech-block, a cam engagement between said piston and said breech-block for first rotating to unlock and then withdrawing said breech-block from said chamber, and for returning and locking the same, and extractors pivoted on said breech-block and operated by said piston, substantially as described.

8. In a breech-loading gun, the combination with a barrel, and a breech-block chamber, of a breech-block provided with a cam-groove therein, a reciprocating motor-piston with a stud or pin to engage in said cam-groove for first rotating to unlock and then withdrawing said breech-block, or vice versa, and extractors pivoted on said breech-block and operated by said piston, substantially as described.

9. In a breech-loading gun, the combination with a barrel and a breech-block chamber, of a breech-block adapted to rotate and lock or unlock in and to move longitudinally into and out of said chamber, with cam-grooves on said breech-block, a reciprocating motor-piston provided with a pin passing through said breech-block and engaging said cam-grooves, and extractors pivoted on said breech-block and operated by said piston, substantially as described.

10. In a breech-loading gun, the combination with a barrel and a breech-block chamber, of a breech-block adapted to rotate and lock or unlock in and to move longitudinally into and out of said chamber, with cam-grooves on said breech-block, of a reciprocating motor-piston provided with a hollow head parallel to the axis of said piston and engaging said breech-block, a pin passing through said hollow head and through the cam-grooves in said breech-block, and extractors pivoted on said breech-block and operated by said hollow head, substantially as described.

11. In a breech-loading gun, the combination with a barrel, and a breech-block chamber, of a breech-block having interrupted engagement in said chamber, a reciprocating motor-piston, means operated by said piston for first rotating to unlock and then withdrawing said breech-block from said chamber, and for returning and locking the same, and extractors traveling in longitudinal guideways and revolubly connected to said breech-block, and operated by said piston, substantially as described.

12. In a gas-operated breech-loading gun, the combination with a breech-block chamber, of a barrel, a cylinder connected to said barrel, a motor-piston mounted in said cylinder, a mainspring for moving said piston in the opposite direction a breech-block having interrupted engagement with said chamber, means operated by said piston for first rotating to unlock and then withdrawing said breech-block from said chamber, and for returning and locking the same, and extractors traveling in longitudinal guideways and revolubly connected to said breech-block, and operated by said piston, substantially as described.

13. In a breech-loading gun, the combination with a barrel, and a breech-block chamber, of a breech-block having interrupted engagement with said chamber, a reciprocating motor-piston, a cam engagement between said piston and said breech-block for first rotating to unlock and then withdrawing said breech-block from said chamber and for returning and locking the same, and extractors traveling in longitudinal guideways and revolubly connected to said breech-block, and operated by said piston, substantially as described.

14. In a gas-operated breech-loading gun, the combination with a breech-block chamber, of a barrel, a cylinder connected to said barrel, a motor-piston mounted in said cylinder, a mainspring for moving said piston in the opposite direction, a breech-block, having interrupted engagement with said chamber, a cam engagement between said piston and said breech-block for first rotating to unlock and then withdrawing said breech-block from said chamber, and for returning and locking the same, and extractors traveling in longitudinal guideways and revolubly connected to said breech-block, and operated by said piston, substantially as described.

15. In a breech-loading gun the combination with a barrel, and a breech-block chamber, of a breech-block provided with a cam-groove therein and having interrupted engagement with said chamber, a reciprocating motor-piston provided with a stud or pin to engage in said cam-groove for first rotating to unlock and then withdrawing said breech-block, or vice versa, and extractors traveling in longitudinal guideways and revolubly connected to said breech-block, and operated by said piston, substantially as described.

16. In a breech-loading gun, the combination with a barrel and a breech-block chamber, of a breech-block adapted to rotate and lock or unlock in and to move longitudinally into and out of said chamber, with cam-grooves on said breech-block, a reciprocating motor-piston provided with a pin passing through said breech-block and engaging said cam-grooves, and extractors traveling in longitudinal guideways and revolubly connected to said breech-block, and operated by said piston, substantially as described.

17. In a breech-loading gun, the combination with a barrel and a breech-block chamber, of a breech-block adapted to rotate and lock or unlock in and to move longitudinally into and out of said chamber, with cam-grooves on said breech-block, of a reciprocating motor-piston provided with a hollow head parallel to the axis of said piston and engaging said breech-block, a pin passing through said hollow head and through the cam-grooves in said breech-block, and extractors traveling in longitudinal guideways and revolubly connected to said breech-block, and operated by said piston, substantially as described.

18. In a breech-loading gun the combination with a barrel, and a breech-block chamber, of a breech-block, a reciprocating motor-piston, and means operated by said piston for first rotating to unlock and then withdrawing said breech-block, from said chamber, and for returning and locking the same, with a firing-pin secured to said piston and passing through said breech-block, substantially as described.

19. In a gas-operated breech-loading gun, the combination with a breech-block chamber, of a barrel, a cylinder connected to said barrel, a motor-piston mounted in said cylinder, a mainspring for moving said piston in the opposite direction, a breech-block, and means operated by said piston for first rotating to unlock and then withdrawing said breech-block from said chamber, and for returning and locking the same, with a firing-pin secured to said piston and passing through said breech-block, substantially as described.

20. In a breech-loading gun, the combination with a barrel, and a breech-block chamber, of a breech-block, a reciprocating motor-piston, and a cam engagement between said piston and said breech-block for first rotating to unlock and then withdrawing said breech-block from said chamber and for returning and locking the same, with a firing-pin secured to said piston and passing through said breech-block, substantially as described.

21. In a gas-operated breech-loading gun, the combination with a breech-block chamber, of a barrel, a cylinder connected to said barrel, a motor-piston mounted in said cylinder, a mainspring for moving said piston in the opposite direction, a breech-block, and a cam engagement between said piston and said breech-block for first rotating to unlock and then withdrawing said breech-block from said chamber, and for returning and locking the same, with a firing-pin secured to said piston and passing through said breech-block, substantially as described.

22. In a breech-loading gun, the combination with a barrel, and a breech-block chamber, of a breech-block provided with a cam-groove therein, and a reciprocating motor-piston provided with a stud or pin to engage in said groove for first rotating to unlock and then withdrawing said breech-block or vice versa, and a firing-pin secured to said pin and mounted in said breech-block, substantially as described.

23. In a breech-loading gun, the combination with a barrel and a breech-block chamber, of a breech-block adapted to rotate and lock or unlock in and to move longitudinally into and out of said chamber, with cam-grooves on said breech-block, a reciprocating motor-piston provided with a pin passing through said breech-block and engaging said cam-grooves, and a firing-pin secured to said pin and mounted in said breech-block, substantially as described.

24. In a breech-loading gun, the combination with a barrel and a breech-block chamber, of a breech-block adapted to rotate and lock or unlock in and to move longitudinally into and out of said chamber, with cam-grooves on said breech-block, of a reciprocating motor-piston provided with a hollow head parallel to the axis of said piston and engaging said breech-block, and a pin passing through said hollow head and through the cam-grooves in said breech-block, and a firing-pin secured to said pin and mounted in said breech-block, substantially as described.

25. In a breech-loading gun, the combination with a barrel, and a breech-block chamber, of a breech-block, a reciprocating motor-piston, means operated by said piston for first rotating to unlock and then withdrawing said breech-block, from said chamber, and for returning and locking the same, a firing-pin mounted in said breech-block and secured to and moving with said piston, and extractors pivoted on said breech-block and operated by said piston, substantially as described.

26. In a gas-operated breech-loading gun, the combination with a breech-block chamber, of a barrel, a cylinder connected to said barrel, a motor-piston mounted in said cylinder a mainspring for moving said piston in the opposite direction a breech-block, means operated by said piston for first rotating to unlock and then withdrawing said breech-block from said chamber, and for returning and locking the same, a firing-pin mounted in said breech-block and secured to and moving with said piston, and extractors pivoted on said breech-block and operated by said piston, substantially as described.

27. In a breech-loading gun, the combination with a barrel, and a breech-block chamber, of a breech-block, a reciprocating motor-piston, a cam engagement between said piston, and said breech-block for first rotating to unlock and then withdrawing said breech-block from said chamber and for returning and locking the same, a firing-pin mounted in said breech-block and secured to and moving with said piston, and extractors pivoted on said breech-block and operated by said piston, substantially as described.

28. In a gas-operated breech-loading gun, the combination with a breech-block chamber, of a barrel, a cylinder connected to said barrel, a motor-piston mounted in said cylinder, a mainspring for moving said piston in the opposite direction, a breech-block, a cam engagement between said piston and said breech-block for first rotating to unlock and then withdrawing said breech-block from said chamber, and for returning and locking the same, a firing-pin mounted in said breech-block and secured to and moving with said piston, and extractors pivoted on said breech-block and operated by said piston, substantially as described.

29. In a breech-loading gun, the combination with a barrel, and a breech-block chamber, of a breech-block provided with a cam-groove therein, a reciprocating motor-piston provided with a stud or pin to engage in said cam-groove for first rotating to unlock and then withdrawing said breech-block, or vice versa, a firing-pin mounted in said breech-block and secured to and moving with said piston, and extractors pivoted on said breech-block and operated by said piston, substantially as described.

30. In a breech-loading gun, the combination with a barrel and a breech-block chamber, of a breech-block adapted to rotate and lock or unlock in and to move longitudinally into and out of said chamber, with cam-grooves on said breech-block, a reciprocating motor-piston provided with a pin passing through said breech-block and engaging said cam-grooves, a firing-pin mounted in said breech-block and secured to and moving with said piston, and extractors pivoted on said breech-block and operated by said piston, substantially as described.

31. In a breech-loading gun, the combination with a barrel and a breech-block chamber, of a breech-block adapted to rotate and lock or unlock in and to move longitudinally into and out of said chamber, with cam-grooves on said breech-block, of a reciprocating motor-piston provided with a hollow head parallel to the axis of said piston and engaging said breech-block, a pin passing through said hollow head and through the cam-grooves in said breech-block, a firing-pin mounted in said breech-block and secured to and moving with said piston, and extractors pivoted on said breech-block and operated by said hollow head, substantially as described.

32. In a breech-loading gun, the combination with a barrel, and a breech-block chamber, of a breech-block, a reciprocating motor-piston, means operated by said piston for first rotating to unlock and then withdrawing said breech-block from said chamber, and for returning and locking the same, extractors pivoted on said breech-block and operated by said piston, means for feeding the cartridges to the gun in front of said breech-block, and an ejector operated by said piston in its rearward motion for ejecting the empty cartridge-cases, substantially as described.

33. In a gas-operated breech-loading gun, the combination with a breech-block chamber, of a barrel, a cylinder connected to said barrel, a motor-piston mounted in said cylinder, a mainspring for moving said piston in the opposite direction, a breech-block, means operated by said piston for first rotating to unlock and then withdrawing said breech-block from said chamber, and for returning and locking the same, extractors pivoted on said breech-block and operated by said piston, means for feeding the cartridges to the gun in front of said breech-block, and an ejector operated by said piston in its rearward motion for ejecting the empty cartridge-cases, substantially as described.

34. In a breech-loading gun, the combination with a barrel, and a breech-block chamber, of a breech-block, a reciprocating motor-piston, a cam engagement between said piston and said breech-block for first rotating to unlock and then withdrawing said breech-block from said chamber and for returning and locking the same, extractors pivoted on said breech-block and operated by said piston, means for feeding the cartridges to the gun in front of said breech-block, and an ejector operated by said piston in its rearward motion for ejecting the empty cartridge-cases, substantially as described.

35. In a gas-operated breech-loading gun, the combination with a breech-block chamber, of a barrel, a cylinder connected to said barrel, a motor-piston mounted in said cylinder, a mainspring for moving said piston in the opposite direction, a breech-block, a cam engagement between said piston and said breech-block for first rotating to unlock and then withdrawing said breech-block from said chamber, and for returning and locking the same, extractors pivoted in said breech-block and operated by said piston, means for feeding the cartridges to the gun in front of said breech-block, and an ejector operated by said piston in its rearward motion for ejecting the empty cartridge-cases, substantially as described.

36. In a breech-loading gun, the combination with a barrel, and a breech-block chamber, of a breech-block provided with a cam-groove therein, a reciprocating motor-piston provided with a stud or pin to engage in said cam-groove for first rotating to unlock and then withdrawing said breech-block, or vice versa, extractors pivoted on said breech-block and operated by said piston, means for feeding the cartridges to the gun in front of said breech-block, and an ejector operated by said piston in its rearward motion for ejecting the empty cartridge-cases, substantially as described.

37. In a breech-loading gun, the combination with a barrel and a breech-block chamber, of a breech-block adapted to rotate and lock or unlock in and to move longitudinally into and out of said chamber, with cam-grooves on said breech-block a reciprocating motor-piston provided with a pin passing through said breech-block and engaging said cam-grooves, extractors pivoted on said breech-block and operated by said piston, means for feeding the cartridges to the gun in front of said breech-block, and an ejector operated by said piston in its rearward motion for ejecting the empty cartridge-cases, substantially as described.

38. In a breech-loading gun, the combination with a barrel and a breech-block chamber, of a breech-block adapted to rotate and lock or unlock in and to move longitudinally into and out of said chamber, with cam-grooves on said breech-block, of a reciprocating motor-piston provided with a hollow head parallel to the axis of said piston and engaging said breech-block, a pin passing through said hollow head and through the cam-grooves in said breech-block, extractors pivoted on said breech-block and operated by said hollow head, means for feeding the cartridges to the gun in front of said breech-block, and an ejector operated by said piston in its rearward motion for ejecting the empty cartridge-cases, substantially as described.

39. In a breech-loading gun, the combination with a barrel, and a breech-block chamber, of a breech-block, a reciprocating motor-piston, means operated by said piston for first rotating to unlock and then withdrawing said breech-block, from said chamber, and for returning and locking the same, extractors pivoted on said breech-block and operated by said piston, means for feeding the cartridges to the gun in front of said breech-block, an ejector for the empty cartridge-cases pivoted transversely to said piston, and a cam engagement between said piston and said ejector, substantially as described.

40. In a gas-operated breech-loading gun, the combination with a breech-block chamber, of a barrel, a cylinder connected to said barrel, a motor-piston mounted in said cylinder, a mainspring for moving said piston in the opposite direction, a breech-block, means operated by said piston for first rotating to unlock and then withdrawing said breech-block from said chamber, and for returning and locking the same, extractors pivoted on said breech-block and operated by said piston, means for feeding the cartridges to the gun in front of said breech-block, an ejector for the empty cartridge-cases pivoted transversely to said piston, and a cam engagement between said piston and said ejector, substantially as described.

41. In a breech-loading gun, the combination with a barrel, and a breech-block chamber, of a breech-block, a reciprocating motor-piston, a cam engagement between said piston and said breech-block for first rotating to unlock and then withdrawing said breech-block from said chamber and for returning and locking the same, extractors pivoted on said breech-block and operated by said piston, means for feeding the cartridges to the gun in front of said breech-block, an ejector for the empty cartridge-cases pivoted transversely to said piston, and a cam engagement between said piston and said ejector, substantially as described.

42. In a gas-operated breech-loading gun, the combination with a breech-block chamber, of a barrel, a cylinder connected to said barrel, a motor-piston mounted in said cylinder, a mainspring for moving said piston in the opposite direction, a breech-block, a cam engagement between said piston and said breech-block for first rotating to unlock and then withdrawing said breech-block from said chamber, and for returning and locking the same, extractors pivoted on said breech-block and operated by said piston, means for feeding the cartridges to the gun in front of said breech-block, an ejector for the empty cartridge-cases pivoted transversely to said piston, and a cam engagement between said piston and said ejector, substantially as described.

43. In a breech-loading gun the combination with a barrel, and a breech-block chamber, of a breech-block provided with a cam-groove therein, a reciprocating motor-piston provided with a stud or pin to engage in said cam-groove for first rotating to unlock and then withdrawing said breech-block, or vice versa, extractors pivoted on said breech-block and operated by said piston, means for feeding the cartridges to the gun in front of said breech-block, an ejector for the empty cartridge-cases pivoted transversely to said piston, and a cam engagement between said piston and said ejector, substantially as described.

44. In a breech-loading gun, the combination with a barrel and a breech-block chamber, of a breech-block adapted to rotate and lock or unlock in and to move longitudinally into and out of said chamber, with cam-grooves on said breech-block, a reciprocating motor-piston provided with a pin passing through said breech-block and engaging said cam-grooves, extractors pivoted on said breech-block and operated by said piston, means for feeding the cartridges to the gun in front of said breech-block, an ejector for the empty cartridge-cases pivoted transversely to said piston, and a cam engagement between said piston and said ejector, substantially as described.

45. In a breech-loading gun, the combination with a barrel and a breech-block chamber, of a breech-block adapted to rotate and lock or unlock in and to move longitudinally into and out of said chamber, with cam-grooves on said breech-block, of a reciprocating motor-piston provided with a hollow head parallel to the axis of said piston and engaging said breech-block, a pin passing through said hollow head and through the cam-grooves in said breech-block, extractors on said breech-block and operated by said hollow head, means for feeding the cartridges to the gun in front of said breech-block, an ejector for the empty cartridge-cases pivoted transversely to said piston, and a cam engagement between said piston and said ejector; substantially as described.

46. In a breech-loading gun having a reciprocating motor-piston and a breech-block in constant engagement therewith, of an extractor or extractors which are thrown into positive engagement with the flange of the cartridge or freed therefrom by the relative motions of piston and breech-block, substantially as described.

47. In a breech-loading gun having a reciprocating motor-piston, the combination of a groove in the piston, an ejector having a stud in engagement with said groove whereby the ejector is given an intermittent motion in a plane at right angles to the motion of the piston, substantially as described.

48. An extractor for use in guns of the character described, having a claw or nib, to engage the flange of the cartridge-case, a hook to engage the breech-block in rear of said claw, and a tail projecting to the rear to form a lever-arm when engaged by the piston, substantially as described.

49. A pair of extractors for use in guns of the character described each provided with a claw or nib to engage the flange of the cartridge-case, a hook to engage the breech-block in rear of said claw, U-shaped tangs to project on either side of the breech-block and fulcrum thereon, and a tail projecting to the rear to form a lever-arm when engaged by the piston, substantially as described.

50. An extractor for use in guns of the character described comprising a nib $p$, to engage the flange of the cartridge-case, a projection $p^2$ beyond said nib to shove the cartridge home, a body provided with the hook $p^3$, and a tail $P^3$ having the bent end $p^5$ to engage with the piston, substantially as described.

51. A pair of extractors for use in guns of the character described, each comprising a main body $P'$, a nib $p$ for engaging the flange of the cartridge-case, a hook $p^3$ to engage with the breech-block, U-shaped tangs adapted to pass around the breech-block and pivot thereon, and a tail $P^3$ having the bent end $p^5$ to engage with the piston, substantially as described.

52. In a breech-loading gun, the combination with a reciprocating motor-piston provided with an abutment, of a pivoted stop, a spring normally pressing said stop in the path of said abutment, and a feed-strip both for supplying ammunition to the gun and for holding said stop clear of said abutment while the gun is loaded, with a cam engagement between said piston and said feed-strip for moving the latter across the gun, substantially as described.

53. In a breech-loading gun, the combination with a reciprocating motor-piston provided with an abutment, of a pivoted stop, a spring normally pressing said stop in the path of said abutment, and a feed-strip both for supplying ammunition to the gun and for holding said stop clear of said abutment while the gun is loaded, with cams on said piston and lugs on said feed-strip engaging said cams as the piston vibrates, substantially as described.

54. In a breech-loading gun, the combination with a reciprocating motor-piston provided with an abutment and cams, of a pivoted stop, a spring normally pressing said stop in the path of said abutment, and a feed-strip having lugs engaging said cams and supplying ammunition to the gun and holding said stop clear of said abutment while the gun is loaded, with means for holding the ammunition on said feed-strip when clear of the gun, and for automatically releasing the same from the feed-strip as the latter is fed to the gun, substantially as described.

55. In a breech-loading gun, the combination with a reciprocating motor-piston provided with an abutment, of a pivoted stop, a spring normally pressing said stop in the path of said abutment, and a feed-strip both for supplying ammunition to the gun and for holding said stop clear of said abutment while the gun is loaded, with clips on said feed-strip and resilient loops for holding the ammunition in said clips when clear of the gun, and for automatically releasing the ammunition from said clips as the feed-strip is fed to the gun, substantially as described.

56. In a breech-loading gun, the combination with a reciprocating motor-piston provided with cam-surfaces thereon, of a receiver having guides for said piston and for the feed-strip, and a feed-strip for the fixed ammunition having lugs engaging the cam-surfaces on the piston, whereby the reciprocating motion of the piston imparts a positive motion to said feed-strip, substantially as described.

57. In a breech-loading gun, the combination with a reciprocating motor-piston provided with cam-surfaces thereon, of a receiver having guides for said piston and for the feed-strip, and a feed-strip for the fixed ammunition having lugs engaging the cam-surfaces on the piston, whereby the reciprocating motion of the piston imparts a positive motion to said feed-strip, with clips on said feed-strip, and resilient loops for holding the ammunition in said clips when clear of the gun, and means for automatically releasing the ammunition from said clips as the feed-strip moves across the gun, substantially as described.

58. In a breech-loading gun the combination with a reciprocating motor-piston provided with cam-surfaces and an abutment, of a receiver having guides for said piston and for the feed-strip, a feed-strip for the fixed ammunition provided with lugs engaging said cam-surfaces, a stop pivoted in said receiver below said feed-strip and pressed downward thereby, and provided with teeth for holding said feed-strip against backward motion, and a spring normally pressing said stop upward and causing it to engage said abutment when the feed-strip is not in the way, substantially as described.

59. In a breech-loading gun the combination with a reciprocating motor-piston provided with cam-surfaces and an abutment, of a receiver having guides for said piston and for the feed-strip, a feed-strip for the fixed ammunition provided with lugs engaging said cam-surfaces, and cut away along its rear portion to permit the projection therethrough of the stop, a stop pivoted in said receiver below said feed-strip and pressed downward thereby, and provided with teeth for holding said feed-strip against backward motion, and a spring normally pressing said stop upward and causing it to engage said abutment when the feed-strip is not in the way, substantially as described.

60. In a breech-loading gun, the combination with a reciprocating motor-piston provided with cam-surfaces and an abutment, of a receiver having guides for said piston and for the feed-strip, a feed-strip for the fixed ammunition provided with lugs engaging said cam-surfaces, a stop pivoted in said receiver below said feed-strip and pressed downward thereby, and provided with teeth adapted to engage said lugs after the same have passed said cams for holding said feed-strip against backward motion, and a spring normally pressing said stop upward and causing it to engage said abutment when the feed-strip is not in the way, substantially as described.

61. In a breech-loading gun, the combination with a reciprocating motor-piston provided with cam-surfaces and an abutment, of a receiver having guides for said piston and for the feed-strip, a feed-strip for the fixed ammunition provided with lugs engaging said cam-surfaces, and cut away along its rear portion to permit the projection therethrough of the stop, a stop pivoted in said receiver below said feed-strip and pressed downward thereby, and provided with teeth adapted to engage said lugs after the same have passed said cams for holding said feed-strip against backward motion, and a spring normally pressing said stop upward and causing it to engage said abutment when the feed-strip is not in the way, substantially as described.

62. In a breech-loading gun, the combination with a reciprocating piston provided with cams on its surface of a feed-strip provided with lugs or tenons engaging said cams, whereby an intermittent advance of the feed-strip is obtained substantially as described and for the purpose set forth.

63. In an automatic gun, the combination with feed mechanism and guides for the feed-strip, of a feed-strip engaging in said guides, cartridge-holding clips on said feed-strip, and a resilient abutment normally holding the cartridges in place on said feed-strip, but releasing said cartridges as the feed-strip is fed across the gun, substantially as described.

64. In a breech-loading gun, the combination with a cartridge-holding feed-strip provided with the cartridge-holding clips and the resilient abutment in rear of the rear clips, of a feed-box mounted in the gun and provided with a projection for forcing the resilient abutment out of the path of the cartridge-rims, and with an inclined groove engaging said rims for withdrawing the cartridges from said clips, with means for moving said feed-strip and for delivering the released cartridges to the chamber of the gun, substantially as described.

65. In a breech-loading gun, the combination with a cartridge-holding feed-strip provided with the cartridge-holding clips and the resilient abutment in rear of the rear clips, of a feed-box mounted in the gun and provided with a projection for forcing the resilient abutment out of the path of the cartridge-rims, and with an inclined groove engaging said rims for withdrawing the cartridges from said clips, with automatically-operated means for moving said feed-strip and for delivering the released cartridges to the chamber of the gun, substantially as described.

66. In a breech-loading gun, the combination with a motor-piston and mechanism for opening and closing the breech, of means for drawing the empty cartridge-case to the rear, and an ejector transversely disposed to and operated by said piston, substantially as described.

67. In a breech-loading gun, the combination with a motor-piston and mechanism for opening and closing the breech, of means for drawing the empty cartridge-case to the rear, and an ejector transversely disposed to and in cam engagement with said piston, substantially as described.

68. In a breech-loading gun, the combination with a motor-piston and mechanism for opening and closing the breech, of means for drawing the empty cartridge-case to the rear and an ejector pivoted at right angles to and in cam engagement with said piston, substantially as described.

69. In a breech-loading gun, the combination with a receiver with guideways therein and a chamber transverse to said guideways, and a reciprocating piston provided with a cam-groove in the side thereof, means operated by said piston for withdrawing the empty cartridge-case rearward, and an ejector mounted in said transverse chamber and having a lug engaging in said cam-groove for ejecting laterally said cartridge-case, substantially as described.

70. In a breech-loading gun, the combination with a receiver with guideways therein and a chamber transverse to said guideways, of a reciprocating motor-piston traveling in said guideways, and provided with a cam-groove in the side thereof, means operated by said piston for withdrawing the empty cartridge-case rearward, and an ejector mounted in said transverse chamber and partly inclosing said piston and rocking thereon, and having a lug engaging in said cam-groove for ejecting laterally said cartridge-case, substantially as described.

71. In a breech-loading gun, the combination with a receiver with guideways therein and a chamber transverse to said guideways, of a reciprocating motor-piston traveling in said guideways, and provided with a cam-groove in the side thereof, means operated by said piston for withdrawing the empty cartridge-case rearward, and an ejector mounted in said transverse chamber and provided with a head engaging the cartridge-case substantially at right angles to the axis of the gun, and a rounded heel partly inclosing said piston and rocking thereon, with a lug from said heel engaging said cam-groove, substantially as described.

72. In a breech-loading gun, the combination with a reciprocating motor-piston, provided with a retaining-lug, of a firing-gear for controlling the frequency of vibrations of said piston, comprising a trigger, for engaging said lug, a firing-lever for releasing said trigger, a spring coacting between said firing-lever and said trigger, and a controlling-lever for regulating the travel of said firing-lever, substantially as described.

73. In a breech-loading gun, the combination with a reciprocating motor-piston, provided with a retaining-lug, of a firing-gear for controlling the frequency of vibrations of said piston, comprising a trigger, for engaging said lug, a firing-lever for releasing said trigger a spring coacting between said firing-lever and said trigger, and a stop of varying radius pivoted in the line of travel of said firing-lever, substantially as described.

74. In a breech-loading gun, the combination with a reciprocating motor-piston, provided with a retaining-lug, of a firing-gear for controlling the frequency of vibrations of said piston, comprising a trigger, for engaging said lug, a firing-lever for releasing said trigger, a spring coacting between said firing-lever and said trigger, and a stop of varying radius pivoted in the line of travel of said firing-lever with a spring-handle for adjusting said stop in the desired position, substantially as described.

75. In a breech-loading gun the combination with a reciprocating motor-piston, provided with a retaining-lug, of a firing-gear for controlling the frequency of vibrations of said piston, comprising a trigger-piece pivoted to the gun and having a trigger engaging said lug, a cocking-toe and a spring-arm, a pivoted firing-lever having a firing-toe, an elongated slot for its pivot, a spring-arm and a firing-handle, a spring connecting the spring-arms of said firing-lever and said trigger-piece, and means for regulating the travel of said firing-handle, substantially as described.

76. In a breech-loading gun, the combination with a reciprocating motor-piston, provided with a retaining-lug, of a firing-gear for controlling the frequency of vibrations of said piston, comprising a trigger-piece pivoted to the gun and having a trigger engaging said lug, a cocking-toe and a spring-arm, a pivoted firing-lever having a firing-toe, an elongated slot for its pivot, a spring-arm and a firing-handle, a spring connecting said spring-arm of said firing-lever and said trigger-piece, and means for regulating the travel of said firing-handle, and a pivoted stop of varying radius registering with the said firing-handle and limiting the travel thereof, substantially as described.

77. In a breech-loading gun, the combination with a reciprocating motor-piston, provided with a retaining-lug, of a firing-gear for controlling the frequency of vibrations of said piston comprising a trigger-piece pivoted to the gun and having a trigger engaging said lug, a cocking-toe and a spring-arm, a pivoted firing-lever having a firing-toe, and an elongated slot for its pivot, a spring-arm and a firing-handle, a spring connecting the spring-arm of said firing-lever and said trigger-piece, means for regulating the travel of said firing-handle, and a pivoted stop of varying radius registering with the said firing-handle and limiting the travel thereof, with a spring-handle for adjusting said stop in the desired position, substantially as described.

In testimony whereof we affix our signatures in presence of two witnesses.

LAWRENCE V. BENÉT.
HENRI A. MERCIÉ.

Witnesses:
A. C. KOERNER,
TH. FAVARGER.